United States Patent
Azuma

(10) Patent No.: US 6,704,608 B1
(45) Date of Patent: Mar. 9, 2004

(54) PORTABLE BODY USED IN TWO WAY, COMMUNICATION SYSTEM, COMMUNICATION METHOD, TERMINAL, COMPUTER-READABLE RECORDED MEDIUM ON WHICH PROGRAM IS RECORDED

(75) Inventor: Masamichi Azuma, Otsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/744,901

(22) PCT Filed: Jul. 30, 1999

(86) PCT No.: PCT/JP99/04099

§ 371 (c)(1),
(2), (4) Date: Jan. 30, 2001

(87) PCT Pub. No.: WO00/07143

PCT Pub. Date: Feb. 10, 2000

(30) Foreign Application Priority Data

Jul. 31, 1998 (JP) ............................................ 10-217236

(51) Int. Cl.[7] ............................................ G05B 19/18
(52) U.S. Cl. .............................. 700/66; 700/65; 700/90; 700/35; 340/825.29; 340/825.69; 340/825.79
(58) Field of Search ............................. 700/35, 65, 66, 700/90; 340/5.1, 5.65, 5.66, 10.33, 825.29, 825.69, 825.59, 825.39, 825.72, 505, 510

(56) References Cited

U.S. PATENT DOCUMENTS

| | | | | |
|---|---|---|---|---|
| 4,310,897 A | * | 1/1982 | Lazzari | 365/1 |
| 4,837,422 A | * | 6/1989 | Dethloff et al. | 235/380 |
| 4,982,070 A | * | 1/1991 | Bezin et al. | 235/378 |
| 5,237,609 A | * | 8/1993 | Kimura | 713/193 |
| 5,434,395 A | * | 7/1995 | Storck et al. | 235/380 |
| 5,471,203 A | * | 11/1995 | Sasaki et al. | 340/5.3 |
| 5,521,362 A | * | 5/1996 | Powers | 235/380 |
| 5,557,662 A | * | 9/1996 | Kenmochi et al. | 379/100.01 |
| 6,266,647 B1 | * | 7/2001 | Fernandez | 705/14 |
| 6,489,883 B1 | * | 12/2002 | Iiyama et al. | 340/5.1 |

FOREIGN PATENT DOCUMENTS

| | | |
|---|---|---|
| DE | 196 11 986 | 10/1996 |
| EP | 0 955 602 | 11/1999 |
| FR | 2 746 200 | 9/1997 |
| JP | 04-069791 | 3/1992 |
| JP | 05346978 | 12/1993 |
| JP | 08016739 | 1/1996 |
| JP | 2543440 | 7/1996 |
| JP | 2557451 | 9/1996 |
| JP | 10-289296 | 10/1998 |

* cited by examiner

*Primary Examiner*—Ramesh Patel

(57) ABSTRACT

An IC card 1 (portable card) having an integrated device. The IC card 1 includes a nonvolatile memory 12 and an encryption circuit 10. The nonvolatile memory 12 is accessed after the IC card 1 is placed in a radio wave zone to receive a power supply from a terminal apparatus through a radio wave. The encryption circuit 10 coordinates with a first terminal apparatus to perform a mutual authentication. The integrated device includes a nonvolatile memory 13 and an encryption circuit 11. The nonvolatile memory 13 is accessed after the IC card 1 is placed at a location close to an antenna in the first terminal apparatus and only after the IC card 1 receives a higher-level power supply from the antenna. The encryption circuit 11 coordinates with the terminal apparatus to perform a mutual authentication. Personal information that requires high security is stored in the nonvolatile memory 13 and the encryption circuit 11 performs a mutual authentication whenever the nonvolatile memory 13 is accessed. This provides a high-level security of the personal information.

11 Claims, 25 Drawing Sheets

| OPERATION MODE | Vdd | SEL | CE | CE1 | CE2 |
|---|---|---|---|---|---|
| CLOSE MODE | >4V | High | High | — | High |
| REMOTE MODE | <4V | Low | High | High | — |

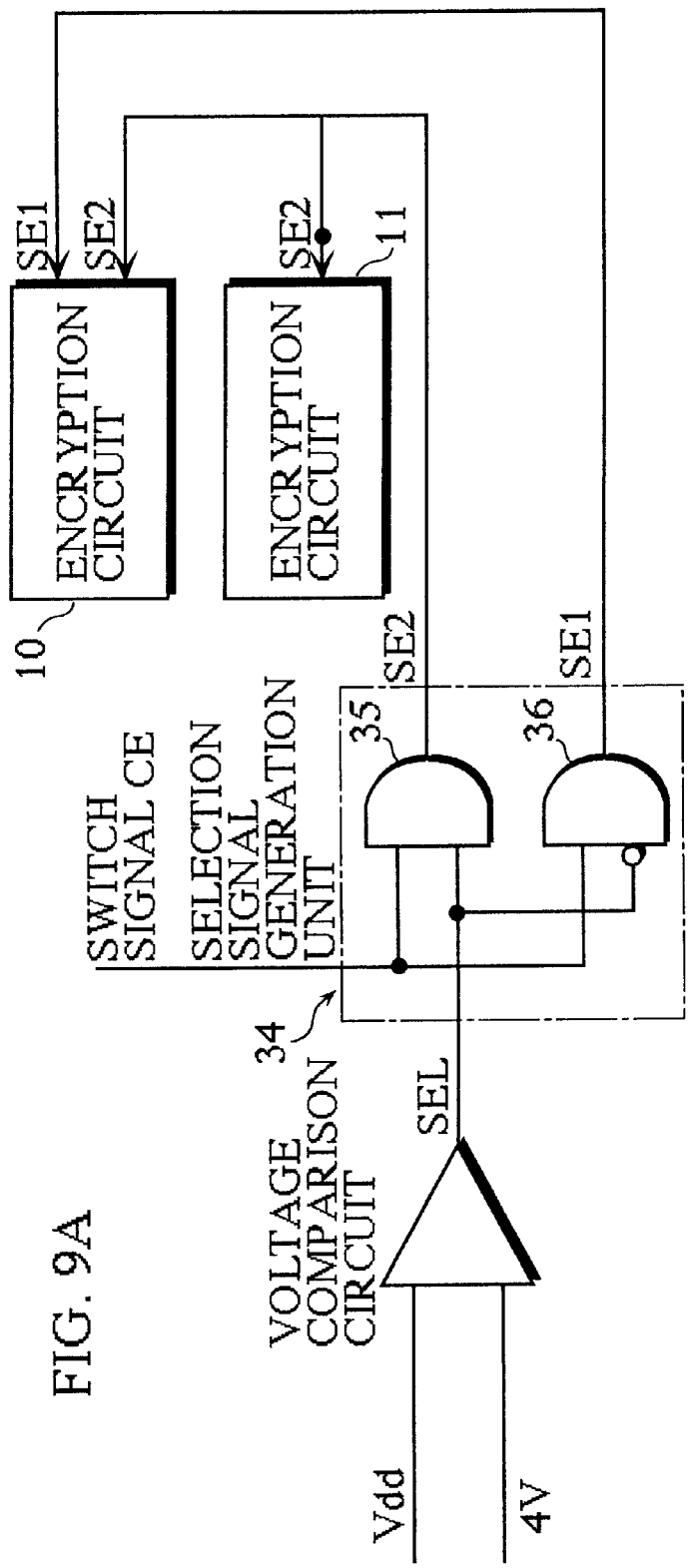

| ENCRYPTION SPECIFICATION | ACCESS SPECIFICATION | MEANING |
|---|---|---|
| 8h | — | READ |
| 4h | — | WRITE |
| 12h | 8h | SE1 |
| | 4h | SE2 |

| ENCRYPTION SPECIFICATION | ACCESS SPECIFICATION | MEANING |
|---|---|---|
| 8h | — | READ |
| 4h | — | WRITE |
| 12h | 8h | CE1 |
| | 4h | CE2 |

PORTABLE BODY USED IN TWO WAY, COMMUNICATION SYSTEM, COMMUNICATION METHOD, TERMINAL, COMPUTER-READABLE RECORDED MEDIUM ON WHICH PROGRAM IS RECORDED

TECHNICAL FIELD

The present invention relates to a portable card containing an integrated device such as an IC card that performs a radio communication with a terminal apparatus, a communication system, a communication method, a terminal apparatus, and a computer-readable record medium recording a program.

BACKGROUND ART

Local governments, transport facilities, financial institutions, medical institutions or the like are interested in management of personal information using IC cards. IC cards are the cards that contain an integrated device (also referred to as a one-chip IC) that includes a nonvolatile memory, a processor, an authentication circuit or the like. An IC card containing a one-chip IC that records personal information can always be carried by the owner. The personal information recorded in an IC card is referred to as occasion demands. Also, the authentication circuit contained in the IC card prevents the personal information from being read improperly. Compared with magnetic cards, IC cards protect the personal information well from improper accesses. Such IC cards conform to ISO standards which have already been provided or will be provided. Remote-type IC cards are defined in ISO14443. Close-type IC cards are defined in ISO10536.

Remote-type IC cards receive electric power from terminal apparatuses through radio waves, then integrated devices inside the IC cards are activated. The remote-type IC cards are said to be suitable for the checking of commuter passes or management of people entering and exiting a facility. For example, when an owner of an IC card holds the IC card over a terminal apparatus formed in a railroad ticket gate to enter the gate to ride on a train, the integrated device contained in the IC card is activated receiving power through radio waves from the terminal apparatus. When the IC card contains an authentication circuit and a memory circuit that stores information indicating that the IC card is used as a commuter pass, information of a railway line section traveled by the card owner, and information of a valid period of the commuter pass, the terminal apparatus in the ticket gate coordinates with the authentication circuit and the memory circuit to check the validity of the IC card. When there is no problem in the travel section and commuter pass period, the terminal apparatus permits the card owner to enter the platform; and when there is a problem, the terminal apparatus prohibits the card owner from entering the platform.

In the case of magnetic cards used as commuter passes, card owners are required to take out a card and let the card pass through a ticket gate. If the above commuter pass checking system becomes prevalent, IC card owners will not be required to do the above operations. This will facilitate commuters who pass through ticket gates using commuter passes, and relieve the congestion at tickets gates such often seen at rush hour in terminal stations in large cities.

A remote-type IC card coordinates with a terminal apparatus to transfer personal information at a ticket gate even though there is some distance between them. Remote-type IC cards are very useful as described above and give us an impression that all the specifications for IC cards for managing personal information may well be unified to a remote-type. However, conventional remote-type IC cards are not suitable for coordination with terminal apparatuses to deal with personal information which should be kept secret. A some different type of IC card would be suitable for dealing with secret, personal information.

The reason for thinking that remote-type IC cards are not suitable for dealing with personal information is as follows. When an improperly intentioned third party holds an IC card over a terminal apparatus while the terminal apparatus is transmitting or receiving personal information to/from another IC card, the third party can store the personal information into the IC card.

Also, it is possible for a communication apparatus located near a terminal apparatus to receive personal information transferred between the terminal apparatus and an IC card. The communication apparatus may be operated by an improperly intentioned third party. That is to say, it is possible for the third party to intercept personal information, or alter the intercepted information and transmit the altered information to the terminal apparatus. In this case, every time a remote-type IC card coordinates with a terminal apparatus, there is a danger that personal information leaks.

Considering the above, storing important personal information into a remote-type IC card for use is not desirable.

There is a method of storing important personal information into IC cards while maintaining the usefulness of the remote type IC cards. It is a combination-type IC card which is made by combining specifications of remote-type IC cards with those of contact-type IC cards. Each contact-type IC card has a contact-type connector. The integrated device in a contact-type IC card is activated when the IC card is connected to a terminal apparatus via the connector. After the IC card is connected to a terminal apparatus, it is impossible for a communication apparatus disposed near the terminal apparatus by an improperly intentioned third party to intercept personal information. In this case, also, the terminal apparatus can check the credibility of the card owner by checking in input code number or the like. As apparent from this, contact-type IC cards are far more excellent than remote-type IC cards in security, and suitable for payment or the like.

Connectors in contact-type IC cards may, however, be smeared or wet. This would reduce the conductivity of the connectors. Therefore, owners of combination-type IC cards are required to treat, keep, or carry the cards carefully to protect connectors from such problems. This puts a constant burden upon the card owners. Also the card owners should carefully insert or remove IC cards so that the cards are not damaged. This makes the card owners nervous whenever they use the IC cards. Suppose each card owner feels nervous when he/she inserts or remove a combination-type IC card into/from a cash dispenser in a financial institution, it takes a lot of time for each one to perform payment. When this happens, a long line of cash dispenser users may be made before each cash dispenser on days when banks have a lot of cash dispenser users for payment.

In addition to the above, when a combination-type IC card is repeatedly made contact with terminal apparatuses, both ends of a connector are worn out, resulting in a faulty connection. If maintenance is frequently required for both the cards and terminal apparatuses due to such faulty connections, financial institutions having cash dispensers may not introduce the combination-type IC card.

DISCLOSURE OF INVENTION

It is therefore the first object of the present invention to provide a dual-purpose portable card used for, for example, payment or passing through a ticket gate, without being electrically connected using a connector.

It is the second object of the present invention to provide a portable card that allows the owner of the card to switch between two purposes of the card, such as payment and passing through a ticket gate.

It is the third object of the present invention to provide a portable card that can be switched between a purpose requiring a heavy-load process and a purpose requiring a light-load process.

The first object is fulfilled by a dual-purpose portable card, the portable card comprising an integrated device which includes: an identifying unit operable to, when the portable card approaches a terminal apparatus, identify either a first purpose or a second purpose for which the portable card is used, based on a radio wave transmitted from the terminal apparatus; a processing unit operable to perform a first process when the portable card is used for the first purpose and perform a second process when the portable card is used for the second purpose; and a communicating unit operable to perform a non-contact-type data input/output between the terminal apparatus and the processing unit by performing radio communication with the terminal apparatus when the portable card is used for either of the first purpose and the second purpose.

With the above construction, when the dual-purpose portable card is a combination-type IC card used for, for example, payment and passing through a ticket gate, a switching between the two purposes and recognition by the terminal apparatus are done in accordance with the radio wave transmitted from the terminal apparatus. In doing so, the card owner is not required to insert or remove a connector, for example. As a result, the portable card of the present invention is highly useful.

Also, when the first purpose and the second purpose require different processes to be done, data input/output between the portable card of the present invention and the terminal apparatus for either purpose is performed through a radio communication. There is no need of connecting a connector to the card. As understood from this, there is no need of worrying about abrasion of a connector or faulty connection in terms of the portable card of the present invention since connection using a connector is not required in switching between the two purposes or in inputting or outputting data. No maintenance is required for the portable card and the terminal apparatus. This makes the payment work or checking at the ticket gate economical.

Furthermore, the portable card of the present invention can communicate with the terminal apparatus even if it is smeared or wet. As apparent from this, the portable card operates normally even if it is treated somewhat roughly, and the owner of the card need not worry about how to carry or store the portable card.

The second object of the present invention is fulfilled by the above portable card, wherein the identifying unit includes: a judging unit operable to judge that the portable card is used for the second purpose when the portable card is a first distance or shorter away from the terminal apparatus, and judge that the portable card is used for the first purpose when a distance between the portable card and the terminal apparatus is in a range of a second distance to a third distance.

With the above construction, the owner of the portable card can use the portable card for the second purpose by bringing it close to the terminal apparatus, and can use it for the first purpose by keeping it at a distance from the terminal apparatus. This facilitates the card owner since the card owner can switch between the two purposes by changing the distance between the portable card and the terminal apparatus.

The third object of the present invention is fulfilled by the above portable card, wherein the integrated device receives a power supply from the terminal apparatus, the power the terminal apparatus supplies to the integrated device changes according to the distance between the portable card and the terminal apparatus, the identifying unit includes a comparing unit operable to compare a received voltage of a radio wave received by an antenna with a predetermined threshold value, and the judging unit judges that the portable card is the first distance or shorter away from the terminal apparatus when the received voltage is higher than the predetermined threshold value, and judges that the distance between the portable card and the terminal apparatus is in the range of the second distance to the third distance when the received voltage is lower than the predetermined threshold value.

With the above construction, the purpose of the portable card can be switched in accordance with the power received by the integrated device. That is to say, either the first process or the second process is selected according to the load and the power consumption required for the process. More particularly, payment, which requires higher confidentialness than checking at a ticket gate, has a larger load due to mutual authentication or data encryption to provide higher security, can be performed when the portable card is the first distance or shorter away from the terminal apparatus when the portable card receives higher power from the terminal apparatus.

Also, the portable card need not have a battery since the integrated device receives a power supply from the terminal apparatus. As a result, the portable card is lighter and simpler than conventional ones.

In the above portable card, the terminal apparatus may be either a first terminal apparatus that outputs a radio wave having power lower than a first power level to the portable card, or a second terminal apparatus that has an antenna in an electromagnetically shielded box and outputs a radio wave having power of a second power level that is twice the first power level or higher, to the portable card in the box, and the predetermined threshold value is determined based on (1) received power of a radio wave that has power of the first power level and is received when the distance between the portable card and the terminal apparatus is in the range of the second distance to the third distance and (2) received power of a radio wave that has power of the second power level and is received when the distance between the portable card and the terminal apparatus is the first distance or shorter.

With the above construction, since the second terminal apparatus has a device that is arranged (e.g., electromagnetically shielded) to prevent leakage of a radio wave, and the portable card is inserted into the electromagnetically shielded device, personal information transferred between the terminal apparatus and the integrated device is prevented from being intercepted by an improperly intentioned third party. Since the second process performed in the close mode can handle personal information that requires high security. Accordingly, the integrated device can coordinate with the terminal apparatus to process the personal information without contacting the internal circuit of the terminal apparatus. Accordingly, the portable card of the present invention not only coordinates with the terminal apparatus through a communication in the remote mode as conventional portable cards do, but performs a process for payment which has been thought unsuitable for such a card from the viewpoint of security. That is to say, one portable card of the present invention includes all personal information required for the two purposes.

Also, the power supplied from the first terminal apparatus can be as low as conforms to the domestic law such as the Radio Law. Accordingly, the portable card can coordinate with the terminal apparatus without violating laws, keeping a necessary distance between them.

In the above portable card, the second purpose may deal with more confidential data than the first purpose, the first process includes at least one of an encryption process for encrypting data using a first encryption key, a decryption process for decrypting data using the first encryption key, a certification process for certifying, in response to an authentication process performed by the terminal apparatus, authenticity of the portable card using the first encryption key, and an authentication process for authenticating the terminal apparatus using the first encryption key, the second process includes at least one of an encryption process for encrypting data using a second encryption key which provides higher security than the first encryption key, a decryption process for decrypting data using the second encryption key, a certification process for certifying, in response to an authentication process performed by the terminal apparatus, authenticity of the portable card using the second encryption key, and an authentication process for authenticating the terminal apparatus using the second encryption key, the second process has a heavier processing load than the first process, and the second power level is determined based on an amount of power consumed when the processing unit performs the second process.

With the above construction, an encryption key providing higher security is used for the second purpose for which higher security is required. As a result, the portable card of the present invention not only coordinates with the terminal apparatus through a communication in the remote mode as conventional portable cards do, but performs a process for payment which has been thought unsuitable for such a card from the viewpoint of security. That is to say, one portable card of the present invention includes all personal information required for the two purposes.

In the above portable card, the integrated device may include a storage unit which includes (1) a first area for storing data that is used only for the first purpose and (2) a second area for storing data that is used only for the second purpose, the communicating unit includes a transmission/reception unit operable to receive a command issued by the terminal apparatus and transmit data to the terminal apparatus using wireless communication, the processing unit includes an access managing unit operable to, when the identifying unit has identified either the first or second purpose, permit either the first or second area corresponding to the identified purpose to be accessed and prohibit the other areas from being accessed, a decoding unit operable to decode the command received by the transmission/reception unit, and a memory access unit operable to, when the decoding unit detects that the command is a read command as a result of the decoding, read a piece of data specified by the read command from either the first or second area and instruct the transmission/reception unit to transmit the piece of data, and operable to, when the decoding unit detects that the command is a write command as a result of the decoding, write a piece of data specified in the write command to the first or second area.

With the above construction, the portable card permits accesses to only a specific area for a predetermined purpose and prevents accesses to the other areas. Accordingly, even if personal information that requires high security is stored in the second area, it is impossible for an improperly intentioned third party to intercept radio communication with the portable card while the portable card is normally carried by the owner.

In the above portable card, the integrated device may include a synchronization clock signal generation unit operable to, when the first terminal apparatus supplies power of the first power level to the portable card, send to the processing unit a synchronization clock signal having a first frequency that is generated in accordance with a frequency of a carrier of a received signal, and operable to, when the second terminal apparatus supplies power of the second power level to the portable card, send to the processing unit a synchronization clock signal having a second frequency that is higher than the first frequency.

With the above construction, as the power supply increases, the frequency of the synchronization clock signal increases. This enables the integrated device to operate at high speed. Also, since the second circuit is activated by the synchronization clock signal having high frequency, a multi-OS software program such as the Java card is applicable.

The above objects are also fulfiled by a terminal apparatus which communicates with a portable card that contains an integrated device set to either a first mode or a second mode, wherein in the first mode, a predetermined process is performed and in the second mode, a process that requires higher security than the first mode is performed, the terminal apparatus comprising: a box which contains an antenna and is electromagnetically shielded so that a radio wave having over a predetermined level of power does not leak from the terminal apparatus; and a communicating unit operable to, after the portable card is inserted into the box, set the integrated device to the second mode and then communicate with the integrated device by allowing the antenna to emit a radio wave.

With the above construction, since the terminal apparatus has a device that is arranged (e.g., electromagnetically shielded) to prevent leakage of a radio wave, an d the portable card is inserted into the electromagnetically shielded device, personal information transferred between the terminal apparatus and the integrated device is prevented from being intercepted by an improperly intentioned third party. Since the second mode performed in the close mode can handle personal information that requires high security. Accordingly, the integrated device can coordinate with the terminal apparatus to process the personal information without contacting the internal circuit of the terminal apparatus. Accordingly, the portable card of the present invention not only coordinates with the terminal apparatus through a communication in the remote mode as conventional portable cards do, but performs a process for payment which has been thought unsuitable for such a card from the viewpoint of security. That is to say, one portable card of the present invention includes all personal information required for the two purposes.

The above terminal apparatus may further comprise one of: a first reading unit operable to read, after the portable card is inserted into the box, physically recorded information indicating authenticity of the portable card, from the portable card; a receiving unit operable to, after the portable card is inserted into the box, receive owner information that is input from an owner of the portable card and indicates authenticity of the owner; and a second reading unit operable to read, after the portable card is inserted into the box, bio-information indicating physical characteristics of the owner, from the owner, and the communicating unit sets the integrated device to the second mode after confirming authenticity of the owner or the portable card using one of the physically recorded information, the owner information, and the bio-information.

With the above construction, it is possible for the terminal apparatus to check the authenticity of the portable card and the card owner using any combination of (a) information physically recorded in the portable card, (b) owner information, and (c) bio-information of the portable card owner. This provides high-level authentication and prevents counterfeit of the portable card.

BRIEF DESCRIPTION OF DRAWINGS

FIG. 9A shows an internal structure of the selection signal generation unit 34.

FIG. 9B shows outputs of the selection signal generation unit 34 in a table format.

FIG. 11A shows an internal structure of the selection signal generation unit 42a.

FIG. 11B shows outputs of the selection signal generation unit 42a in a table format.

BEST MODE FOR CARRYING OUT THE INVENTION

Figure 1A:
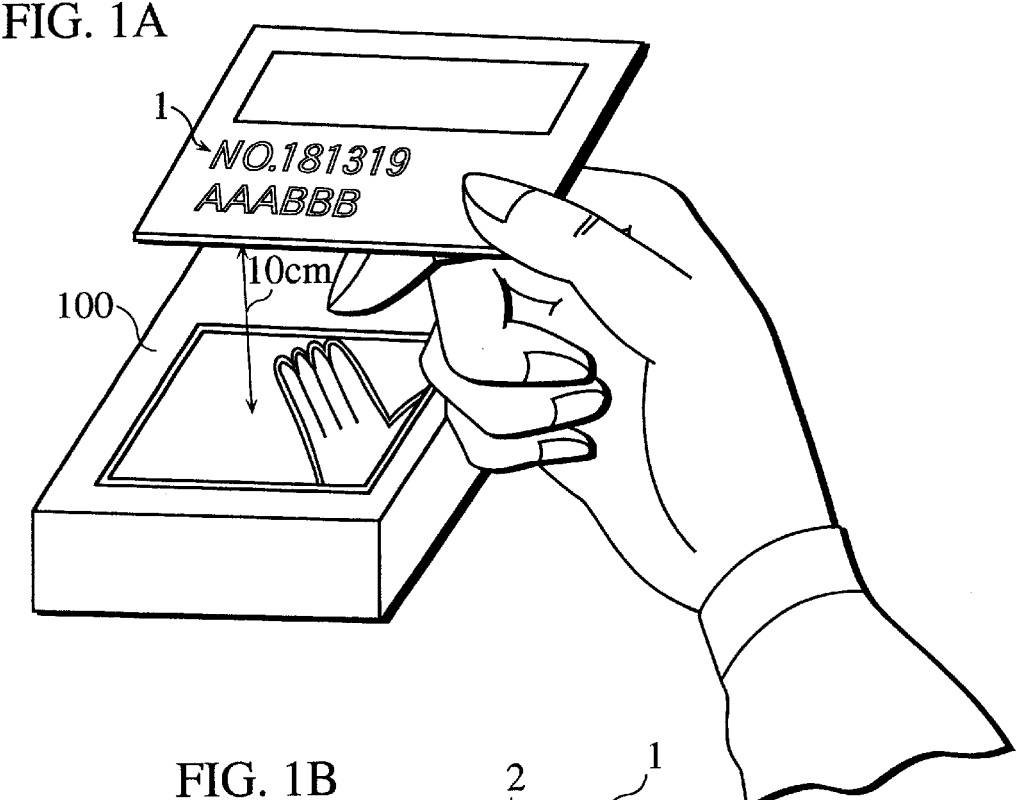
FIG. 1A shows an appearance of the IC card 1 in the embodiment.
Figure 1B:
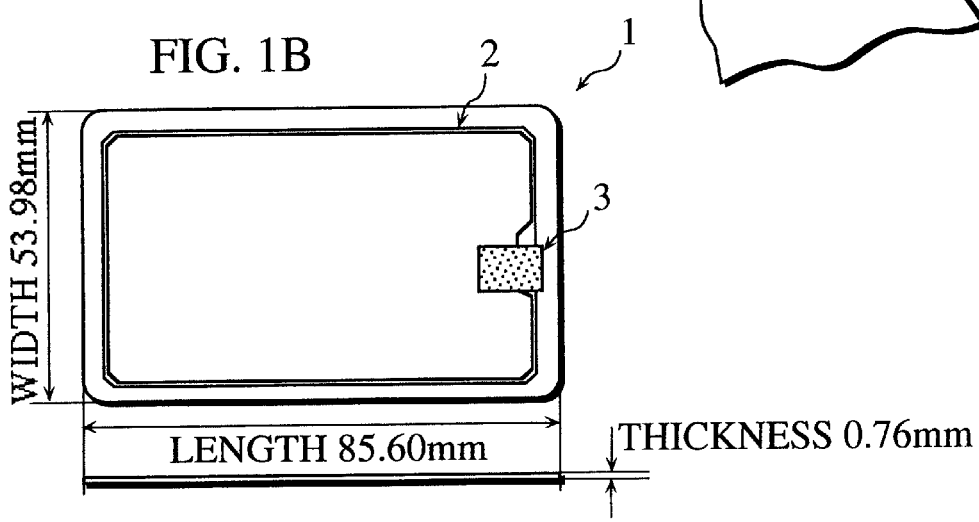
FIG. 1B shows the size and internal structure of the IC card 1 in the embodiment.
Figure 1C:
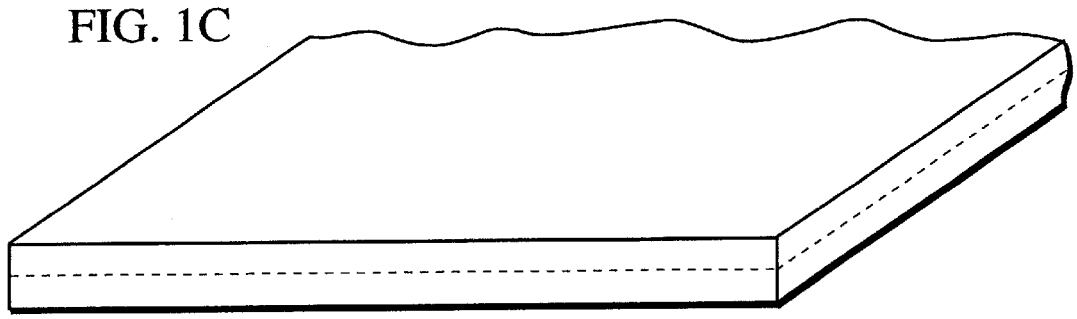
FIG. 1C shows enlarged sides of the IC card.

The following is a description of an embodiment of the present invention, namely an IC card 1 which is a portable card including an integrated device. FIG. 1A shows an appearance of the IC card 1. FIG. 1B shows the size and internal structure of the IC card 1. As shown in FIG. 1A, the IC card 1 coordinates with a dedicated card reader/writer 100 (hereinafter referred to as R/W 100) when they are several cm to 10 cm away from each other. As shown in FIG. 1B, the IC card 1 is 53.98 mm wide, 85.60 mm long, and 0.76 mm thick (this dimension conforms to the ISO card size defined in ISO/IEC 7810). The owner of the IC card 1 can, as shown in FIG. 1A, hold the card with fingers. On the surface of the IC card 1, a character sequence indicating an identification number is embossed ("NO. 181319 AAABBB" in FIG. 1A). As shown in FIG. 1B, inside of the IC card 1 includes: a loop antenna 2 with 4–5 turns; and a one-chip IC 3 being the integrated device. It should be noted here that the IC card 1 is only 0.76 mm thick and cannot contain a battery or a power circuit. FIG. 1C shows enlarged sides of the IC card. As understood from FIG. 1C, no connectors, pins or the like that electrically connect to the loop antenna 2 or the one-chip IC 3 are formed on the sides of the IC card, and the sides are sealed to prevent metals or the like from being exposed outside the IC card. Since the IC card does not have any connectors, pins or the like, the one-chip IC 3 is driven by receiving power by radio waves from a terminal apparatus via the loop antenna 2.

Figure 2:
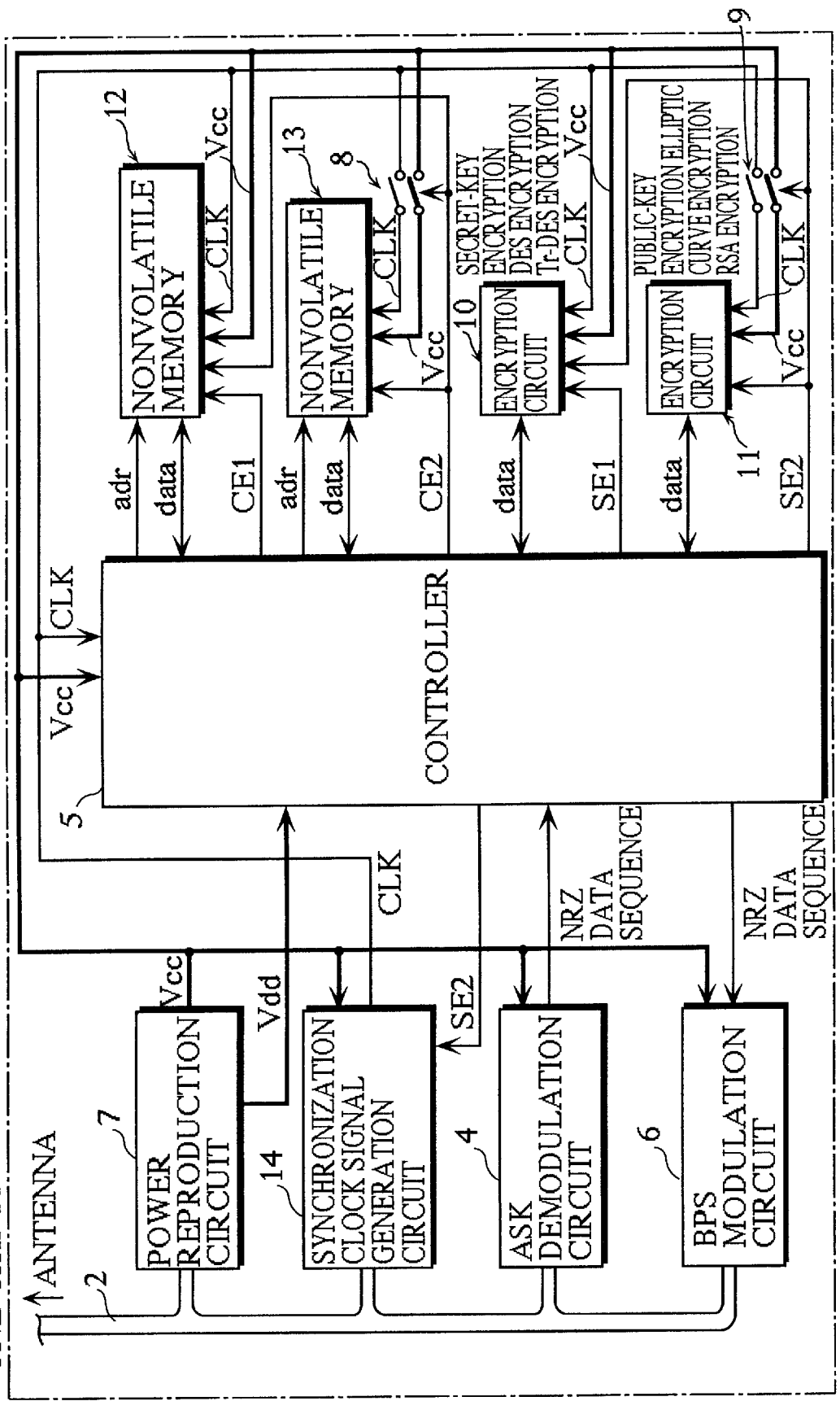
FIG. 2 shows the internal structure of the one-chip IC 3.

Now, the internal structure of the one-chip IC 3 will be described. FIG. 2 shows the internal structure of the one-chip IC 3. As shown in FIG. 2, the one-chip IC 3 includes an ASK demodulation circuit 4, a controller 5, a BPSK modulation circuit 6, a power reproduction circuit 7, a switch 8, a switch 9, an encryption circuit 10, an encryption circuit 11, a nonvolatile memory 12, a nonvolatile memory 13, and a synchronization clock signal generation circuit 14.

Figure 3:
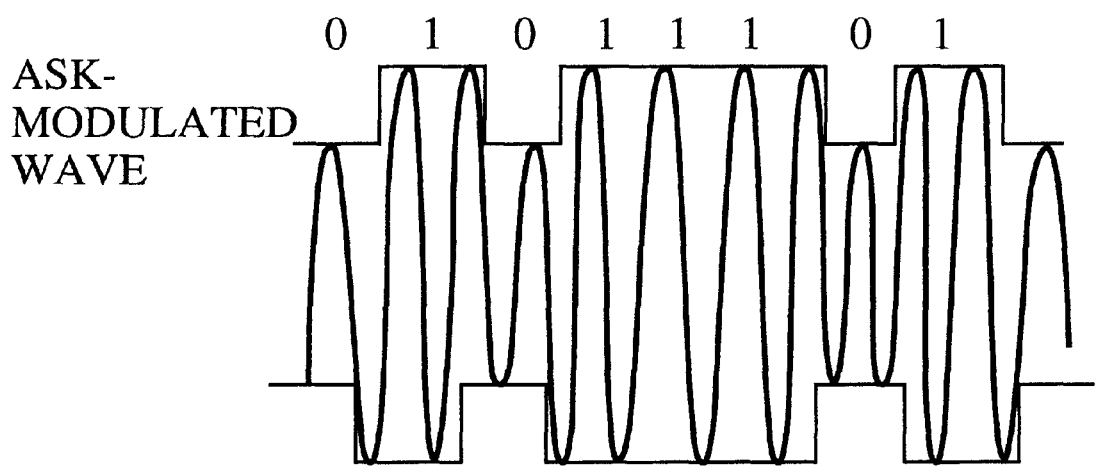
FIG. 3 shows an ASK-modulated wave.

The ASK (Amplitude Shift Keying) demodulation circuit 4 demodulates, by the envelope demodulation, a modulated wave (radio wave) induced in the loop antenna 2, and outputs NRZ (Non-Return-to-Zero) data superimposed on an envelope of the modulated wave to the controller 5. FIG. 3 shows a modulated wave modulated by the ASK demodulation circuit 4. As shown in FIG. 3, the envelope shape of the carrier of the ASK-modulated wave indicates data sequence "01011101". The wave shown in FIG. 3 has been modulated with the "ASK10%" method which produces a wave in which a ratio of the maximum amplitude to the minimum amplitude is approximately 10:9. In the ASK10%, the peak difference between the center frequency and the data frequency is relatively large, and the electric power provided by the terminal apparatus is high. Furthermore, the data sequence in the modulated wave is transferred to the IC card 1 at a transfer rate of 10–424 Kbps. The data transfer at this rate is much faster than the transfer rate at contact-type IC cards (9600 bps as defined in ISO7816 and ISO10536). As a result, the IC card 1 can input and output data at high speed and process a large amount of data per unit time.

The controller 5 (1) manages modes of the IC card 1, and (2) accesses the nonvolatile memories 12 and 13. The modes managed by the controller 5 include: a remote mode which is activated when the portable card is disposed at a location several cm to 10 cm away from the terminal apparatus; and a close mode which is activated only when the portable card is close to the terminal apparatus with a distance of 0–5 mm in between while the integrated device does not contact the internal circuit of the terminal apparatus. In the remote mode, the controller 5 sets signal CE1 output to the nonvolatile memory 12 to high level, and signal SE1 output to the encryption circuit 10 to high level. In the close mode, the controller 5 sets signal CE2 output to the nonvolatile memories 12 and 13 to high level, and signal SE2 output to the encryption circuits 10 and 11 to high level.

In the memory access by the controller 5, the controller writes data to the nonvolatile memory 12 or 13 in accordance with a command received from the terminal apparatus via the loop antenna 2 and the ASK demodulation circuit 4, reads data from the nonvolatile memory 12 or 13 in accordance with a command received from the terminal apparatus via the loop antenna 2 and the BPSK modulation circuit 6, and outputs the read data via the BPSK modulation circuit 6 and the loop antenna 2. In the close mode, important personal information is input or output. The data received from the terminal apparatus is therefore encrypted, and the encrypted data is decrypted or re-encrypted by the encryption circuit 10. The decrypted or re-encrypted data is written onto the nonvolatile memory 12 or 13.

The BPSK (Binary Phase Shift Keying) modulation circuit 6 modulates the data sequence output from the controller 5 with the load-switching method, sub-modulates the data sequence with the BPSK method using a sub-carrier of 847.5 Khz, and outputs the result to the terminal apparatus. Since the BPSK modulation circuit 6 performs the modulation with a different method from the ASK demodulation circuit 4, the BPSK modulation circuit 6 can radio by receiving power from the ASK-modulated waves.

Figure 4:
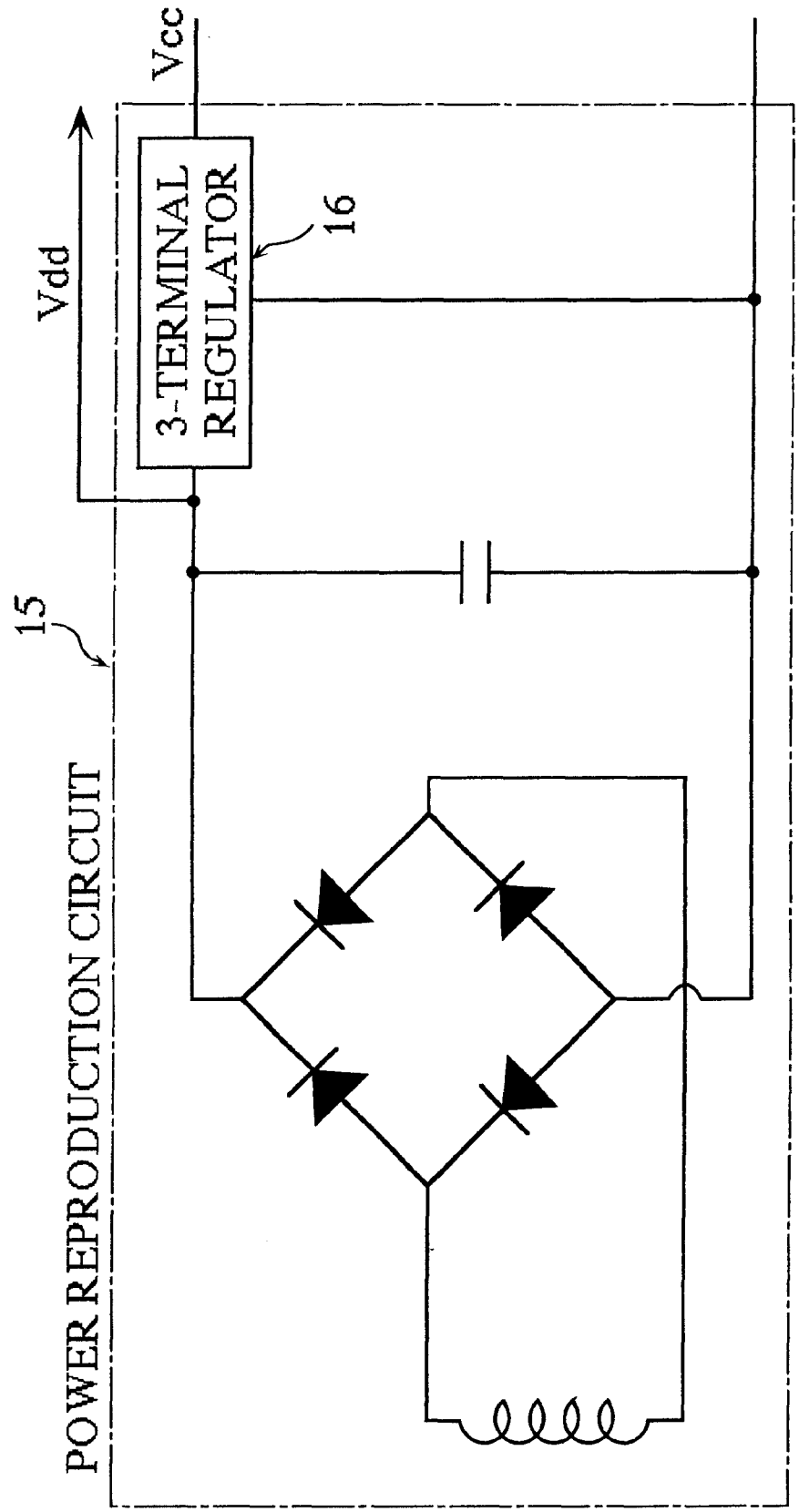
FIG. 4 shows an internal structure of the power reproduction circuit 7.

The power reproduction circuit 7 obtains constant voltage by rectifying the ASK-modulated waves, and supplies power to the ASK demodulation circuit 4, controller 5, BPSK modulation circuit 6, encryption circuit 10, encryption circuit 11, nonvolatile memory 12, nonvolatile memory 13, and synchronization clock signal generation circuit 14. FIG. 4 shows the internal structure of the power reproduction circuit 7. As shown in FIG. 4, the power reproduction circuit 7 includes four diodes and one capacitor, and is composed of a diode bridge circuit 15 and a 3-terminal regulator 16, where the diode bridge circuit 15 rectifies an ASK-modulated wave induced in the loop antenna 2, and the 3-terminal regulator 16 converts a signal output from the diode bridge circuit 15 into a constant voltage of, for example, 3 V. Here, the power supplied from the terminal apparatus through the ASK-modulated wave increases or decreases depending on the distance from the terminal apparatus. That is to say, the shorter the distance from the terminal apparatus is, the higher the voltage output from the diode bridge circuit 15 is. In other words, this voltage (represented as Vdd) output to the controller 5 changes as the amplitude changes. When the IC card 1 is used in Japan, the power supplied by the power reproduction circuit 7 through radio waves in the remote mode should be lower than 10 mW. This is because transmitting radio waves of 10 mW or higher without permission is banned by the Radio Law. In contrast, the power supplied through radio waves in the close mode can be 10 mW or higher. This is because in the close mode, the loop antenna 2 of the IC card 1 is close to the antenna of the terminal apparatus in a box which is electromagnetically shielded.

The switch 8 is open in the remote mode, and is closed for conduction only when the controller 5 sets signal SE2 to a high level. When the switch 8 is closed for conduction, the constant voltage generated by the power reproduction circuit 7 and the synchronization clock signal generated by the synchronization clock signal generation circuit 14 are supplied to the nonvolatile memory 13.

The switch 9 is open in the remote mode, and is closed for conduction only when the controller 5 sets signal SE2 to a high level. When the switch 9 is closed for conduction, the constant voltage generated by the power reproduction circuit 7 and the synchronization clock signal generated by the synchronization clock signal generation circuit 14 are supplied to the encryption circuit 11.

The encryption circuit 10 is used for mutual authentication between the IC card 1 and the terminal apparatus after the IC card 1 approaches the terminal apparatus and the one-chip IC 3 is activated in the remote mode. The encryption circuit 10 is also used for encrypting security-required data when the data is transmitted or received between the IC card 1 and the terminal apparatus after the one-chip IC 3 is activated in the close mode. That is to say, when a data sequence obtained by demodulating a radio wave has been encrypted, the encryption circuit 10 decrypts the encrypted data sequence and outputs it to the controller 5. Also, when necessary, the encryption circuit 10 further encrypts a piece of encrypted data using another key and outputs it to the controller 5. The encryption circuit 10 performs encryption using the secret-key encryption, DES (Data Encryption Standard) encryption, Tr-DES encryption or the like.

The encryption circuit 11 is used for mutual authentication between the IC card 1 and the terminal apparatus after the IC card 1 becomes close to the terminal apparatus and the integrated device is activated in the close mode. The encryption circuit 11 performs encryption using the public-key encryption (the elliptic curve encryption or the RSA (Rivest, Shamir, Adleman) encryption).

The nonvolatile memory 12 is achieved by a rewritable ferro-electric memory, FeRAM, or EEPROM having capacity of 16 bytes, and stores personal information used in the remote or close mode. Such information is read or written from/to the nonvolatile memory 12 when signal CE1 or CE2 is output.

The nonvolatile memory 13 is achieved by a rewritable ferro-electric memory, FeRAM, or EEPROM having capacity of 16 bytes, and stores personal information used only in the close mode. The information is read or written from/to the nonvolatile memory 13 when signal CE2 is output.

Figure 6:
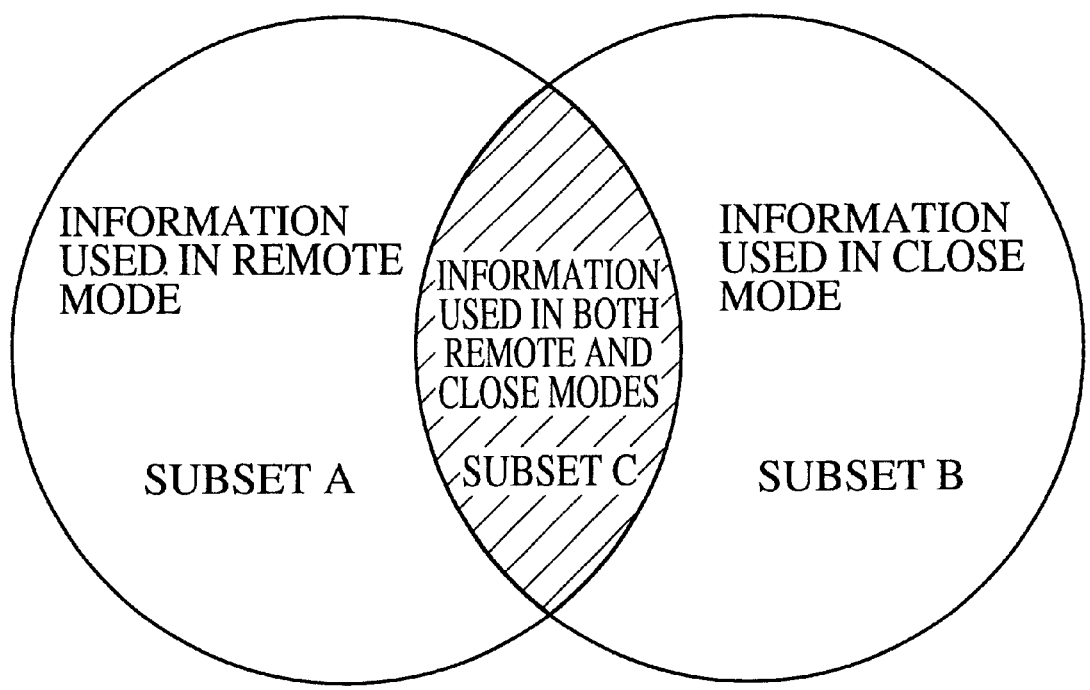
FIG. 6 is a Venn diagram used for explaining the concept of storing the personal information in the nonvolatile memories 12 and 13.

The personal information is stored in the nonvolatile memories 12 and 13 as follows. FIG. 6 is a Venn diagram used for explaining the concept of storing the personal information in the nonvolatile memories 12 and 13. In FIG. 6, subset A is a set of personal information used only in the remote mode, subset B is a set of personal information used only in the close mode, and subset C is a set of personal information used in both the remote and close modes. The nonvolatile memory 12 stores the subsets A, B, and C. The nonvolatile memory 13 stores the subsets B.

When the IC card 1 is a bank card, the balance is assigned to the subset C, a large sum of payment that is highly secret information is assigned to the subset B, and a small sum of payment that is easy to handle is assigned to the subset A. When the IC card 1 is a resident card issued by a local government, the name and address are assigned to the subset C, personal information, such as family registration and withholding tax, that is highly secret information is assigned to the subset B, and information of tennis courts or meeting rooms reserved by the owner of the card that is easy to handle is assigned to the subset C.

Figure 5:
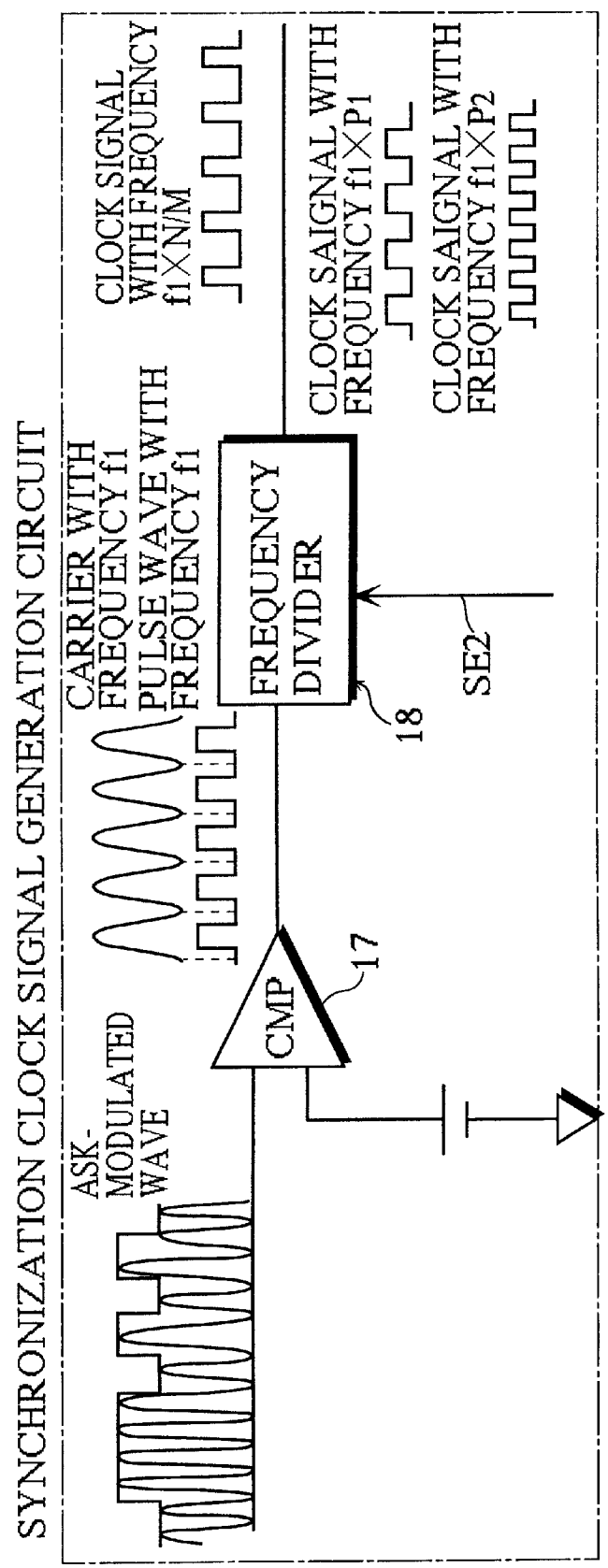
FIG. 5 shows an internal structure of the synchronization clock signal generation circuit 14.

The synchronization clock signal generation circuit 14 obtains a synchronization clock signal from the ASK-modulated wave, and supplies the ASK-modulated wave to the controller 5, encryption circuit 10, encryption circuit 11, nonvolatile memory 12, and nonvolatile memory 13. FIG. 5 shows the internal structure of the synchronization clock signal generation circuit 14. As shown in the drawing, the synchronization clock signal generation circuit 14 includes a comparator 17 and a frequency divider 18, where the comparator 17 compares the amplitude voltage of the ASK-modulated wave with a certain threshold voltage to obtain a pulse signal having the frequency f1 of the carrier, the frequency divider 18 divides the frequency f1 of the pulse signal into N/M pieces and outputs the pieces as a synchronization clock signal, N being an integer of 1 or higher, M being an integer of 2 or higher more, and relationship represented as N<M being satisfied. The frequency division ratio used by the frequency divider 18 is set to P1 when signal SE2 output from the controller 5 is a low level; and the frequency division ratio is set to P2 (P2>P1) when signal SE2 output from the controller 5 is a high level. When the frequency of the carrier is 13.56 MHZ, the frequency division ratio P1 should be a value that satisfies the condition that the frequency of the synchronization clock signal (P1×13.56 MHZ) is 1 MHZ or lower, and the frequency division ratio P2 should be a value that satisfies the condition that the frequency of the synchronization clock signal (P2×13.56 MHZ) is higher than 2 MHZ.

The clock signal frequency is set as described above since the clock signal frequency affects the power consumption of the integrated device. That is to say, since in Japan, the power supplied in the remote mode through radio waves should be lower than 10 mW, the frequency of the synchronization clock signal obtained by the synchronization clock signal generation circuit 14 by dividing the frequency f1 of the pulse signal should satisfy the condition that the power consumption of the integrated device is lower than 10 mW. The above frequency of 1 MHZ or lower satisfies this condition. On the contrary, since in Japan, the power supplied in the close mode through radio waves should be 10 mW or higher, the frequency of the synchronization clock signal obtained by the synchronization clock signal generation circuit 14 by dividing the frequency f1 of the pulse signal should satisfy the condition that the power consumption of the integrated device is 10 mW or higher. The above frequency of higher than 2 MHZ satisfies this condition. As understood from above, in the close mode, a synchronization signal having a frequency two times as high as the remote mode is supplied. Therefore, in the close mode, the integrated device can operate at a speed two times as high as the remote mode.

Figure 7:
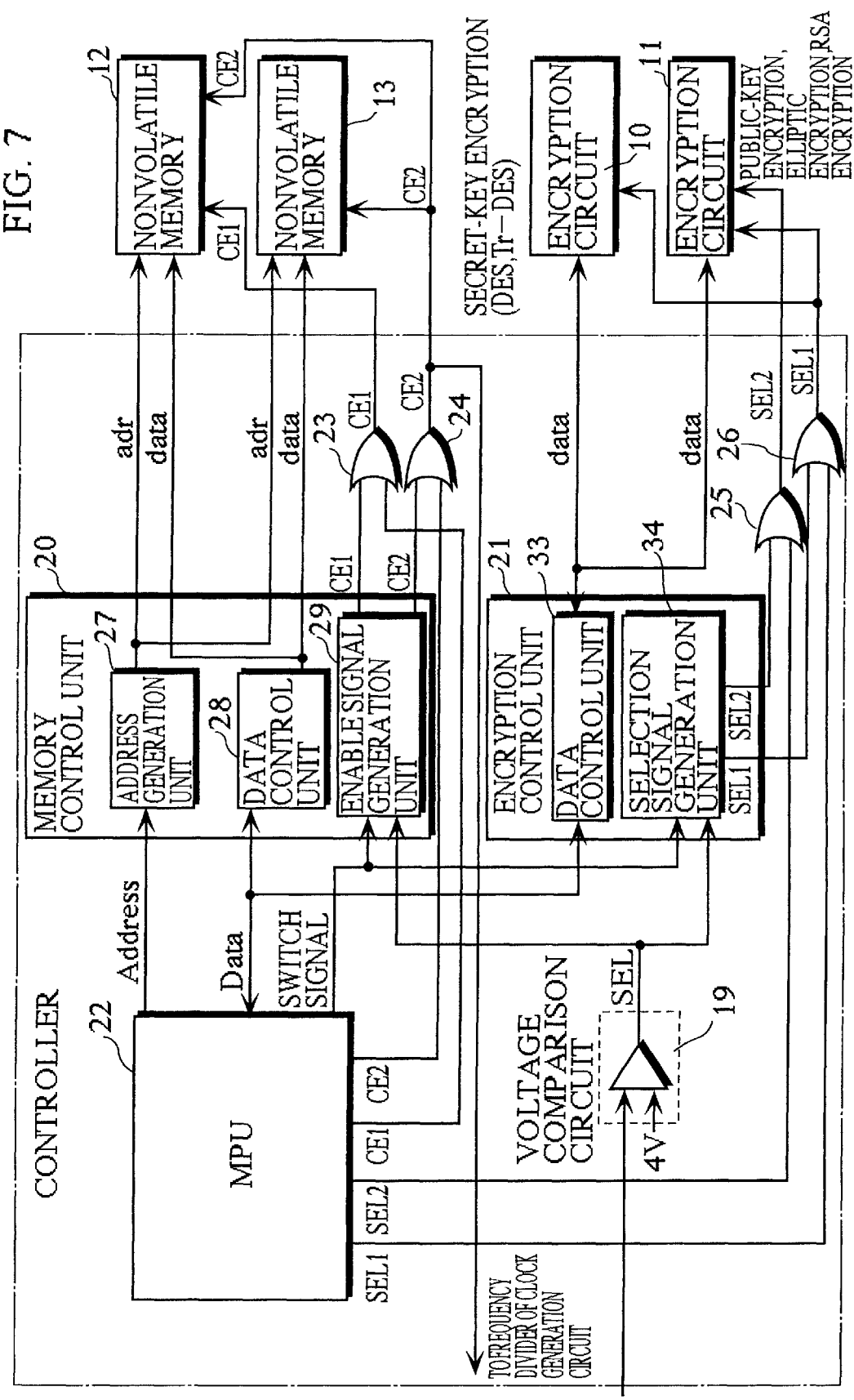
FIG. 7 shows an internal structure of the controller 5.

Now, the internal structure of the controller 5 will be described. FIG. 7 shows the internal structure of the controller 5. As shown in the drawing, the controller 7 includes a voltage comparison circuit 19, a memory control unit 20, an encryption control unit 21, an MPU 22, and OR circuits 23 to 26.

The voltage comparison circuit 19 compares voltage Vdd output from the diode bridge circuit 15 with the threshold value 4V to judge which of them is higher, and sets the operation mode of the IC card 1 to either the close mode or the remote mode. That is to say, when the voltage Vdd is higher than the threshold value, the voltage comparison circuit 19 sets the operation mode to the close mode and sets the SEL signal to the high level; and when the voltage Vdd is lower than the threshold value, the voltage comparison circuit 19 sets the operation mode to the remote mode and keeps the SEL signal at the low level.

Figures 8A, 8B:
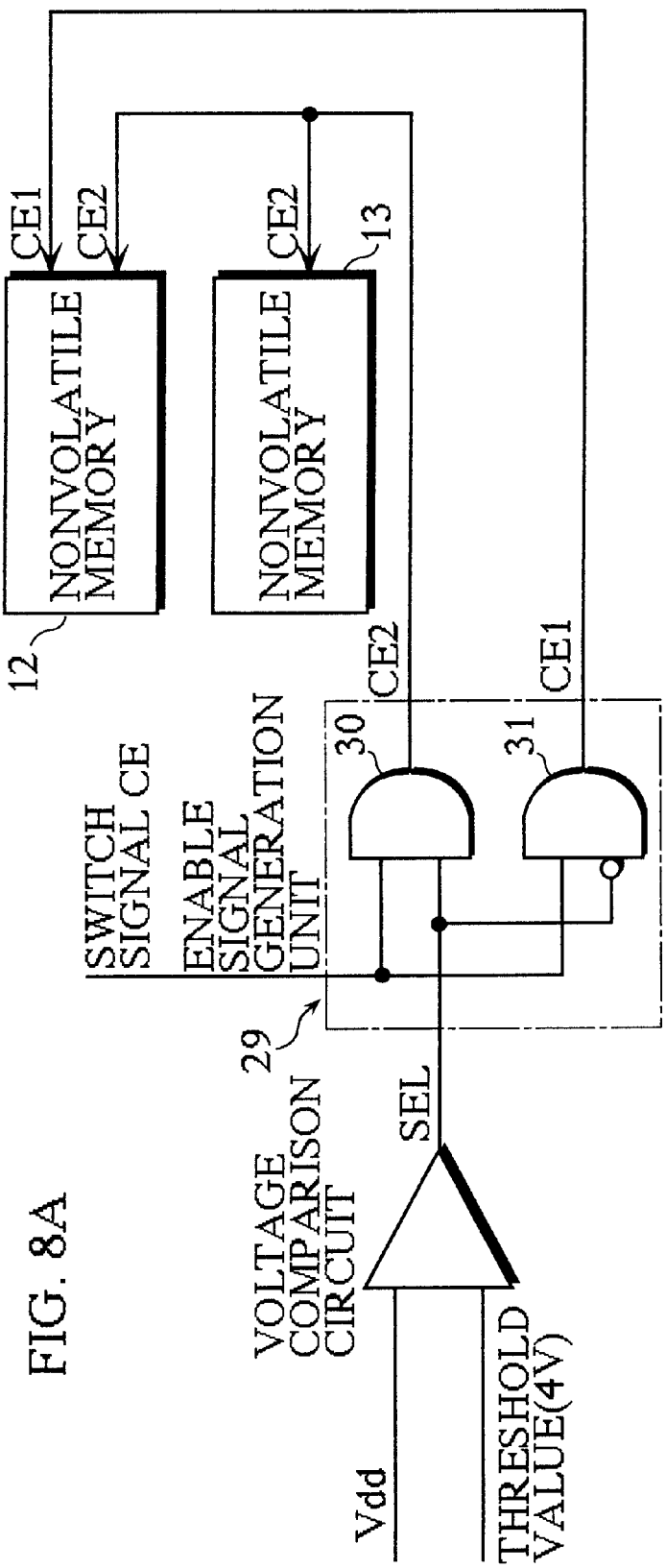
FIG. 8A shows an internal structure of the enable signal generation unit 29.
FIG. 8B shows outputs of the enable signal generation unit 29 in a table format.

The memory control unit 20 includes an address generation unit 27, a data control unit 28, and an enable signal generation unit 29, where the address generation unit 27 controls addresses of the nonvolatile memories 12 and 13 in accordance with an instruction from the MPU 22, and the data control unit 28 controls data reading or writing from/to the nonvolatile memories 12 and 13. FIG. 8A shows the internal structure of the enable signal generation unit 29. In FIG. 8A, the switch signal CE is (1) set to the high level when the MPU 22 refers the switching between the remote mode and close mode to the voltage comparison circuit 19, and (2) set to the low level when MPU 22 performs the switching between the remote mode and close mode by itself.

The MPU 22 performs the switching between the remote mode and close mode by itself in the following cases. While the voltage comparison circuit 19 performs the switching, the IC card is receiving radio waves other than those from the terminal apparatus. In this case, when the voltage Vdd at the diode bridge circuit 15 becomes high occasionally, the operation mode may be switched to the close mode by mistake. The MPU 22 performs the switching by itself when it is expected that the switching is performed erroneously as above. FIG. 8B shows in a table format how signals CE1 and CE2 are set in accordance with the combination of the switch signal CE, Vdd, and threshold value. The enable signal generation unit 29 includes an AND circuit 30 and an AND circuit 31. The AND circuit 30 performs an AND operation using the switch signal CE and the SEL signal output from the voltage comparison circuit 19, and sets signal CE2 to the high level when both the SEL signal and the switch signal CE are the high level so that the nonvolatile memories 12 and 13 are selected (see the row of CLOSE MODE in FIG. 8B). The AND circuit 31 performs an AND operation using the switch signal CE and an inverted value of the SEL signal, and sets signal CE1 to the high level when signal SEL is the low level and the switch signal CE is the high level so that only the nonvolatile memory 12 is selected (see the row of REMOTE MODE in FIG. 8B).

The encryption control unit 21 includes a data control unit 33 and a selection signal generation unit 34. The data control unit 33 controls the data input/output from/to the encryption circuits 10 and 11 in accordance with an instruction from the memory control circuit 20. FIG. 9A shows the internal structure of the selection signal generation unit 34. FIG. 9B shows in a table format how the signals SE1 and SE2 are set in accordance with the combination of the switch signal CE, Vdd, and threshold value 4V. As understood from these drawings, the selection signal generation unit 34 is similar to the enable signal generation unit 29. The selection signal generation unit 34 includes an AND circuit 35 and an AND circuit 36. The AND circuit 35 sets signal SE2 to the high level when both the SEL signal and the switch signal CE are the high level so that the encryption circuits 10 and 11 are selected (see the row of CLOSE MODE in FIG. 9B). The AND circuit 36 performs an AND operation using the switch signal CE and an inverted value of the SEL signal, and sets signal SE1 to the high level when the signal SEL is the low level and the switch signal CE is the high level so that only the encryption circuit 10 is selected (see the row of REMOTE MODE in FIG. 9B).

Figure 10:
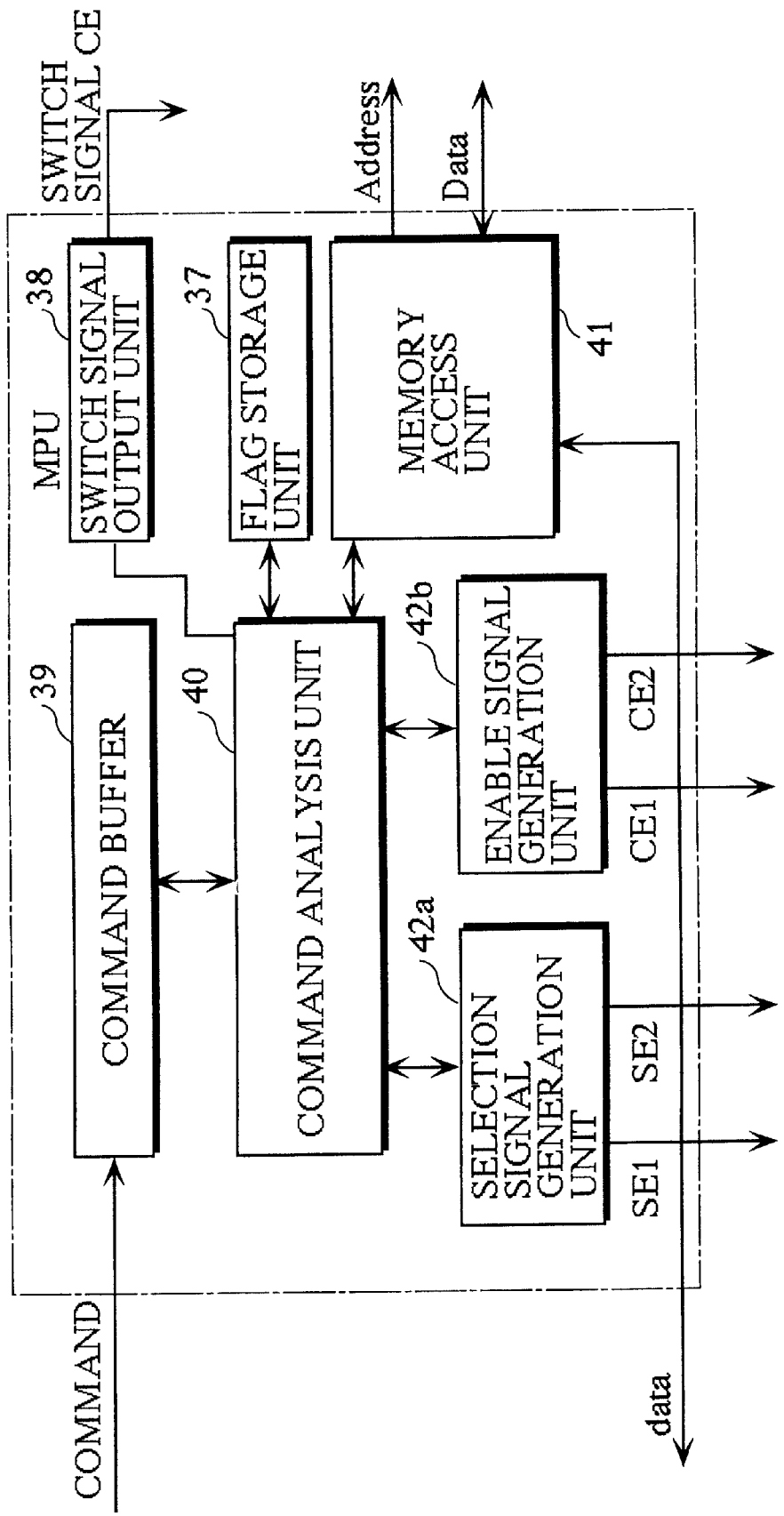
FIG. 10 shows an internal structure of the cash dispenser 60.

The MPU 22 has an internal structure shown in FIG. 10, and includes: a flag storage unit 37 storing a flag that indicates whether the MPU 22 refers the mode switching to the voltage comparison circuit 19 or performs it by itself; a switch signal output unit 38 for setting the switch signal CE to (1) the high level when the MPU 22 refers the switching to the voltage comparison circuit 19, and (2) the low level when MPU 22 performs the switching between by itself; a command buffer 39 for, when the BPSK modulation circuit 6 outputs an NRZ data sequence, taking in the NRZ data sequence as a command; a command analysis unit 40 for analyzing the data sequence taken in as a command; a memory access unit 41 for accessing the memory in accordance with the result of the analysis by the command analysis unit 40; a selection signal generation unit 42a for outputting signals SE1 and SE2 when the flag indicates that the MPU 22 performs the switching by itself; and an enable signal generation unit 42b for outputting signals CE1 and CE2 when the command indicates that the MPU 22 performs the switching by itself. The manufacturer of the IC card 1 determines at shipping whether the mode switching is to be performed using a command or electric power. The command used for the mode switching is a polling command which is issued for polling by a first terminal apparatus or a second terminal apparatus which will be described later.

Now, the selection signal generation unit 42a and the enable signal generation units 42b will be described.

Figures 11A, 11B:
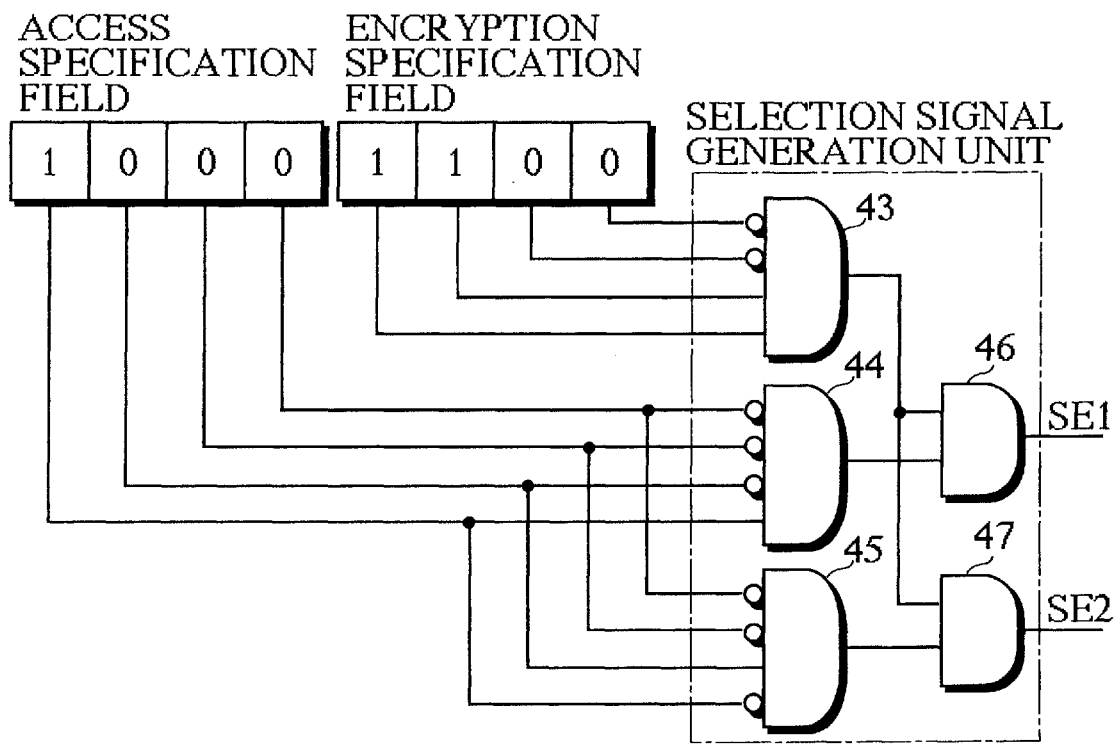

The selection signal generation unit 42a controls outputting of signals SE1 and SE2 based on a 4-bit access specification field and a 4-bit encryption specification field in the command. FIG. 11A shows an internal structure of the selection signal generation unit 42a. An upper part of FIG. 11A shows a 4-bit access specification field and a 4-bit encryption specification field in the polling command. FIG. 11B shows whether data is read or written and whether signal SE1 or SE2 is set to the high level, which can be recognized from a corresponding combination of the values specified in the 4-bit access specification field and the 4-bit encryption specification field.

An AND circuit 43 outputs "1" to AND circuits 46 and 47 when the lower two bits of the encryption specification field are "00" and the upper two bits are "11".

An AND circuit 44 outputs "1" to the AND circuit 46 when the lower three bits of the access specification field are "000" and the upper one bit is "1".

An AND circuit 45 outputs "1" to the AND circuit 47 when the upper two bits of the access specification field are "01" and the lower two bits are "00".

An AND circuit 46 sets signal SE1 to "1", or the high level when both the AND circuit 43 and AND circuit 44 output An AND circuit 47 sets signal SE2 to "1", or the high level when both the AND circuit 43 and AND circuit 45 output With the above outputs, the encryption circuits 10 and 11 are selected based on the definition shown in FIG. 11B.

More specifically, signal SE1 is set to the high level and the encryption circuit 10 is selected when the encryption specification field is 12h (=1100) and the access specification field is 8h (=1000). Also, signal SE2 signal is set to the high level and the encryption circuits 10 and 11 are selected when the specification field is 12h (=1100) and the access specification field is 4h (=0100).

Figures 12A, 12B:
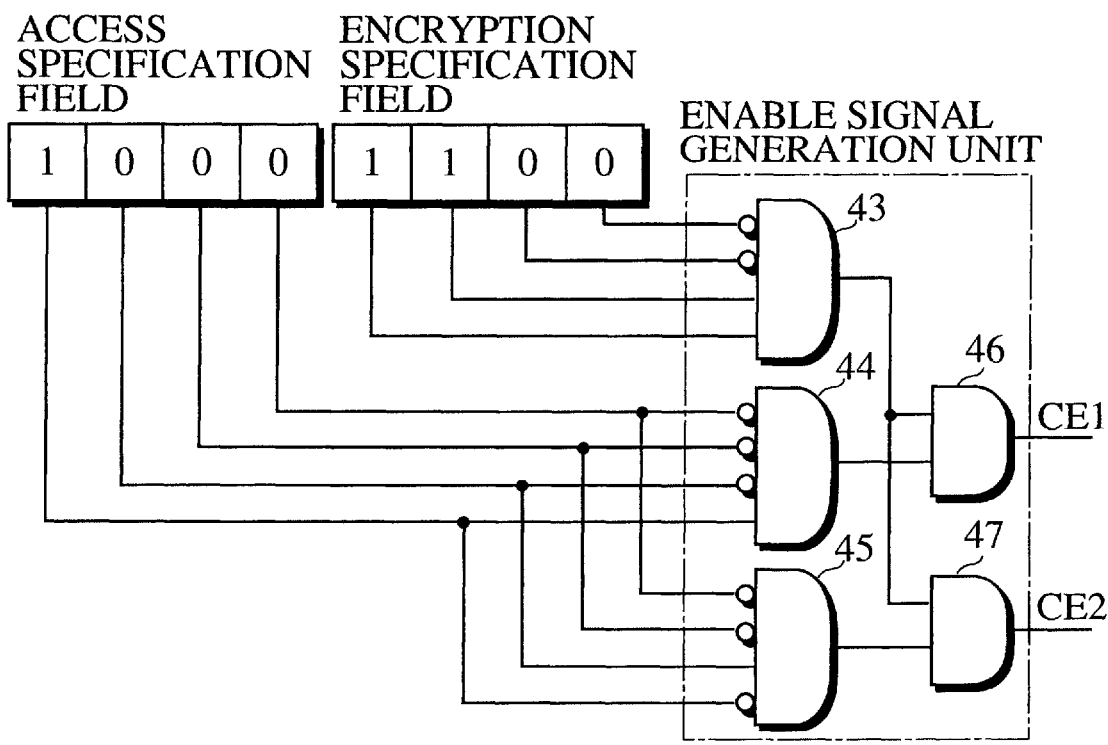
FIG. 12A shows an internal structure of the enable signal generation unit 42b.
FIG. 12B shows outputs of the enable signal generation unit 42b in a table format.

The enable signal generation unit 42b controls outputting of signals CE1 and CE2 based on a 4-bit access specification field and a 4-bit encryption specification field in the polling command. The enable signal generation unit 42b has the same circuit structure as the selection signal generation unit 42a, as shown in FIG. 12A. An upper part of FIG. 11A shows a 4-bit access specification field and a 4-bit encryption specification field in the polling command. FIG. 12B shows whether data is read or written and whether signal CE1 or CE2 is set to the high level, which can be recognized from a corresponding combination of the values specified in the 4-bit access specification field and the 4-bit encryption specification field. More specifically, signal CE1 is set to the high level and the nonvolatile memories 12 and 13 are selected when the access specification field is 8h (=1000). Also, signal CE2 is set to the high level and only the nonvolatile memory 12 is selected when the access specification field is 4h (=0100).

Up to now, the MPU 22 has been described. Now, the remaining components of the controller 5 will be explained. The OR circuit 23 shown in FIG. 7 outputs either signal CE1 output from the MPU 22 or signal CE1 output from the enable signal generation unit 29 to the nonvolatile memory 12.

The OR circuit 24 outputs either signal CE2 output from the MPU 22 or CE2 output from the enable signal generation unit 29 to the nonvolatile memory 13.

The OR circuit 25 outputs either signal SE1 output from the MPU 22 or SE1 output from the selection signal generation unit 34 to the nonvolatile memory 12.

The OR circuit 26 outputs either signal SE2 output from the MPU 22 or SE2 output from the selection signal generation unit 34 to the nonvolatile memory 13.

Figure 13:
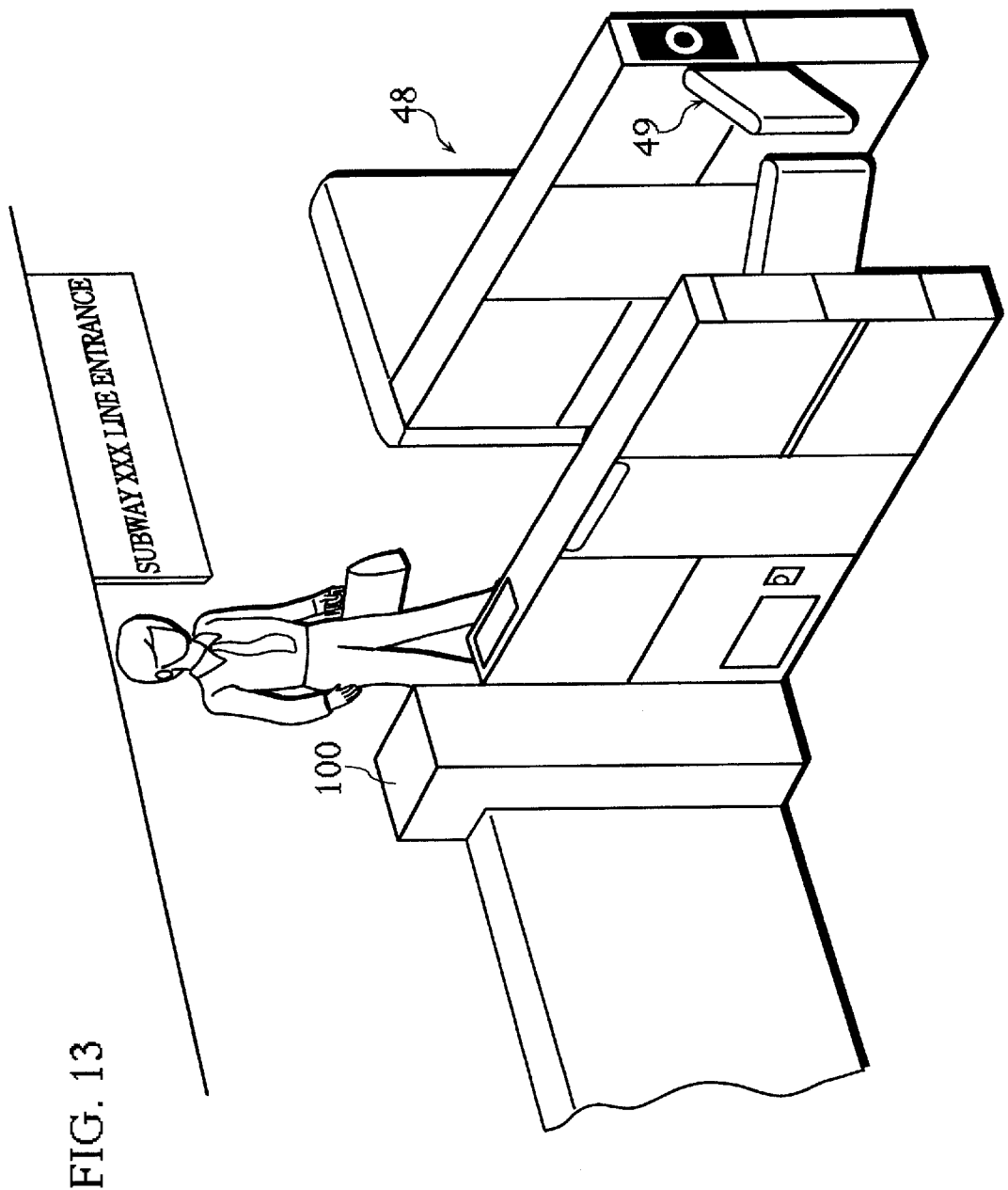
FIG. 13 shows the automatic ticket gate 48 that has the first terminal apparatus.

Up to now, the IC card 1 has been described. Now, the first terminal apparatus will be described. FIG. 13 shows an automatic ticket gate 48 that has the first terminal apparatus. The automatic ticket gate 48 has a gate 49 and a R/W 100. The gate 49 opens and closes in control of the first terminal apparatus.

Figure 14:
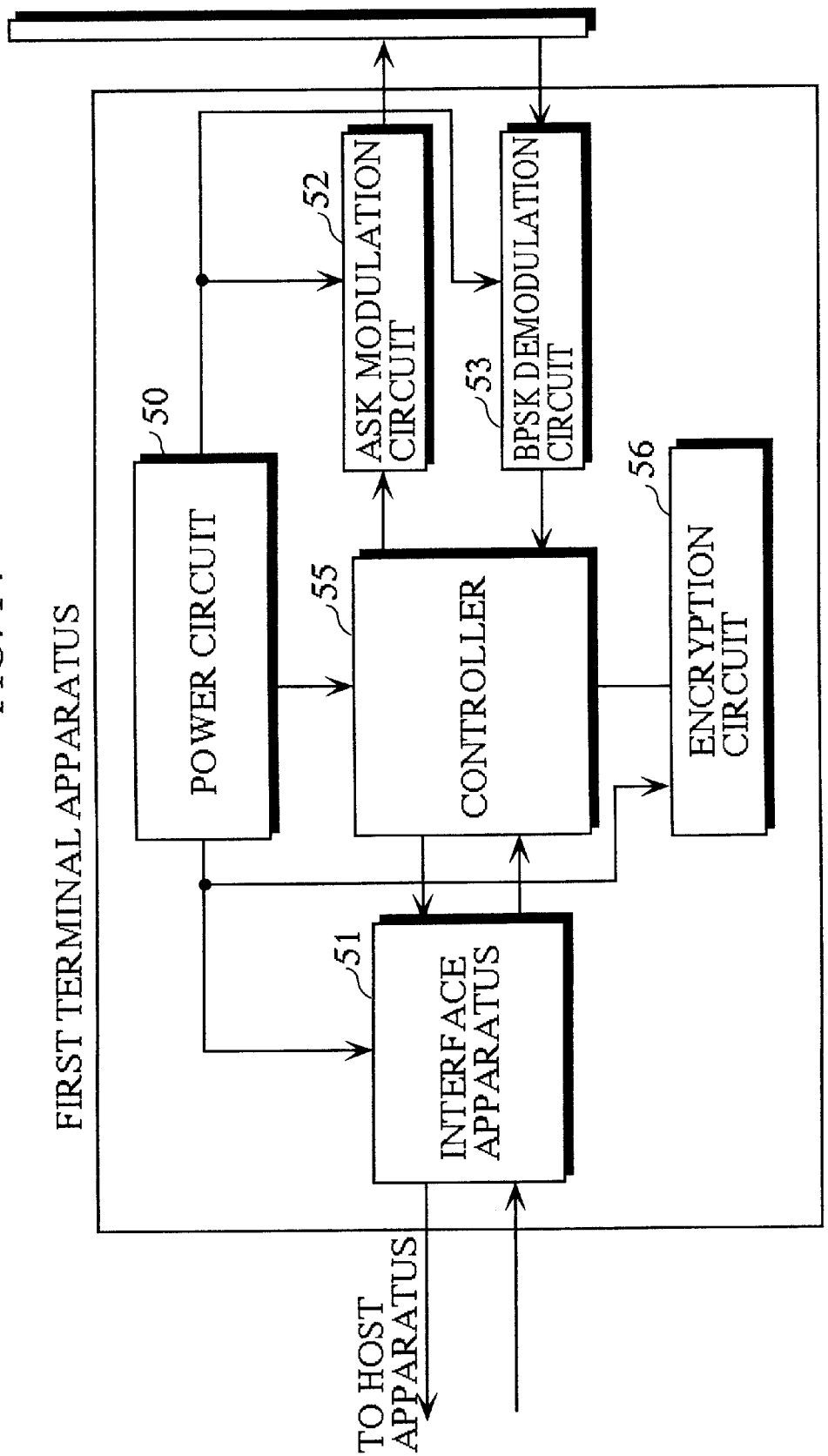
FIG. 14 shows an internal structure of the first terminal apparatus.

FIG. 14 shows an internal structure of the R/W 100 (in hereinafter, the R/W 100 and the first terminal apparatus are regarded as a same apparatus). As shown in FIG. 14, the first terminal apparatus includes a power circuit 50, an interface apparatus 51, an ASK modulation circuit 52, a BPSK demodulation circuit 53, a controller 55, and an encryption circuit 56.

It is found by referring to FIG. 14 that while the IC card 1 does not include a power circuit, the first terminal apparatus includes the power circuit 50. Also, while the integrated device of the IC card 1 is not activated until power is supplied from a terminal apparatus, internal circuits of the first terminal apparatus are always driven by the embedded power circuit 50. Furthermore, while the IC card 1 does not include an interface used for connecting to other apparatus, the first terminal apparatus includes the interface apparatus 51 for coordinating with a host apparatus of a management system in the station.

While the IC card 1 includes an ASK demodulation circuit and a BPSK modulation circuit, the first terminal apparatus includes the ASK modulation circuit 52 and the BPSK demodulation circuit 53. The ASK-modulated wave can provide high electric power as described earlier. For this reason, the first terminal apparatus ASK-modulates the power generated by the power circuit 50, and supplies the modulated power to the IC card 1 coming close to the first terminal apparatus. The IC card 1 includes encryption circuits 10 and 11, where the encryption circuit 10 encrypts using a secret key, and the encryption circuit 11 encrypts using a public key. In contrast, the first terminal apparatus includes only the encryption circuit 56 which encrypts using a secret key, and does not include an encryption circuit for encrypting using a public key.

Figure 15:
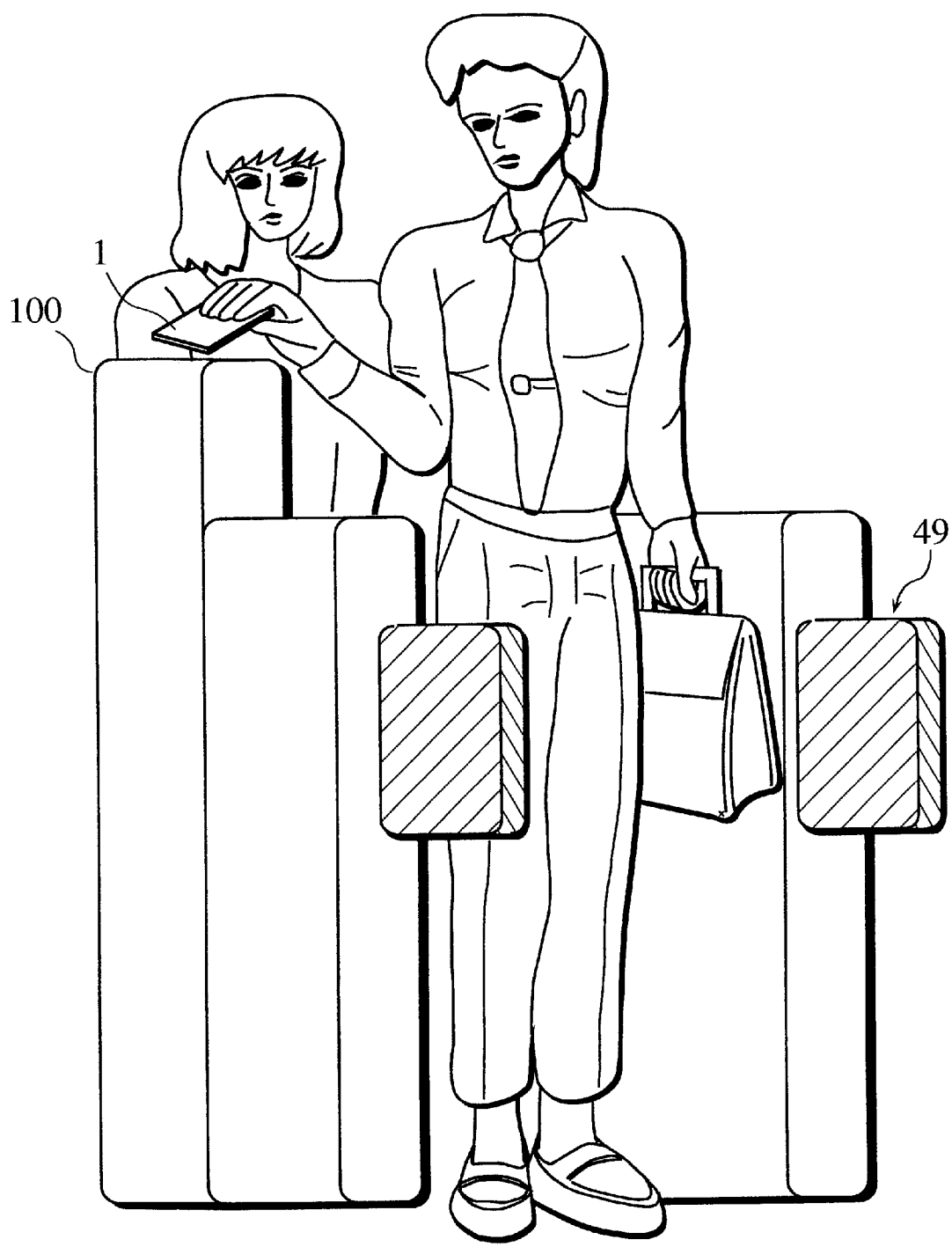
FIG. 15 shows that an owner of the IC card 1 takes out the IC card 1 from a pocket and holds the IC card 1 over an antenna of the first terminal apparatus.
Figure 16:
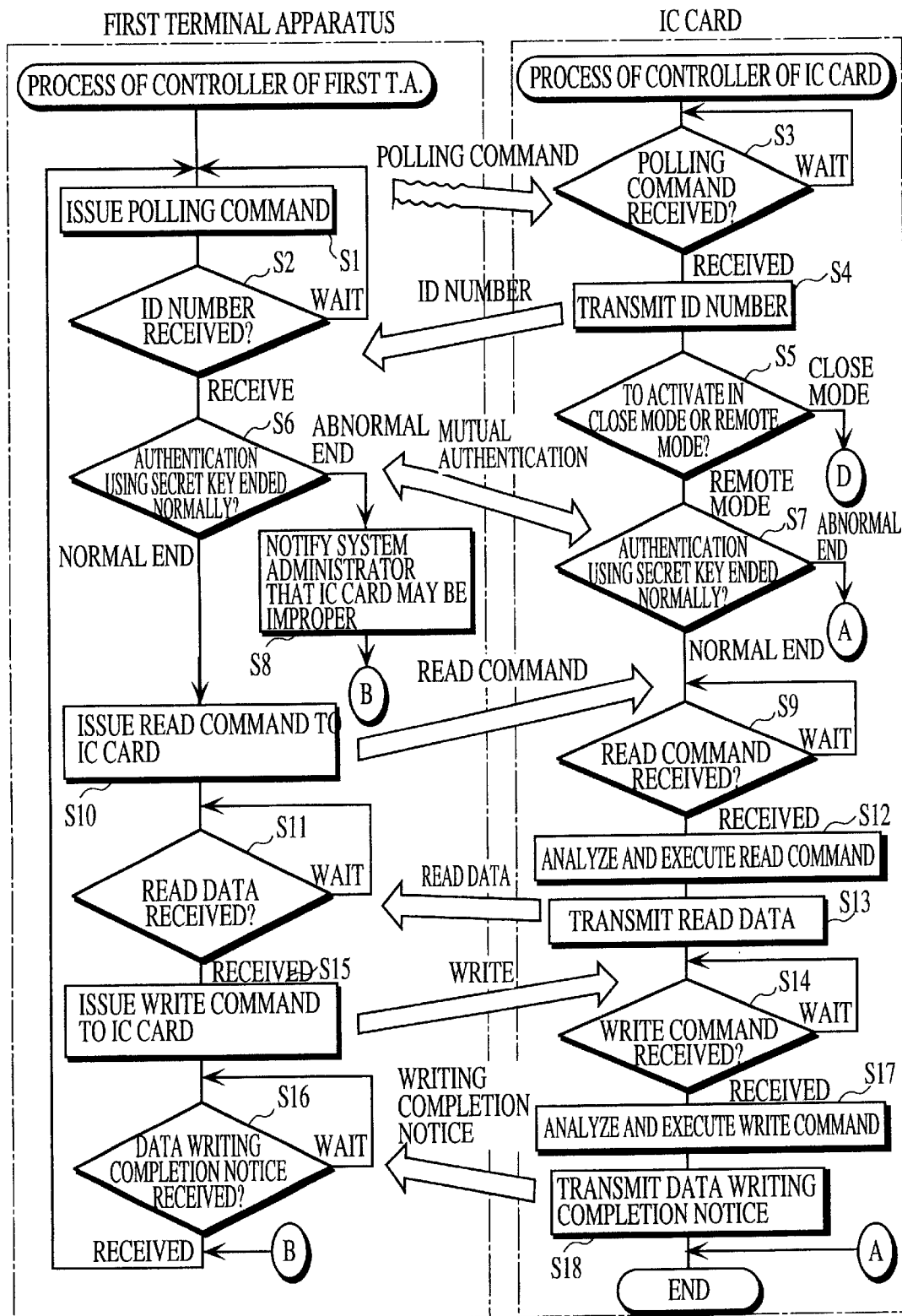
FIG. 16 shows a communication protocol executed by the controller 55 of the first terminal apparatus and the controller 5 of the IC card 1.

FIG. 16 shows a communication protocol executed by the controller 55 of the first terminal apparatus and the controller 5 of the IC card 1. The communication protocol will be explained with reference to FIG. 16. The controller 55 of the first terminal apparatus issues the polling command in step S1, and in step S2, waits for the IC card 1 to issue an ID number. The controller 55 of the first terminal apparatus waits for the IC card 1 to approach by repeating the steps S1 and S2. Here, suppose that, as shown in FIG. 15, an owner of the IC card 1 takes it out from a pocket, approaches the first terminal apparatus, and holds the IC card 1 over the R/W 100 (the first terminal apparatus). The IC card 1 is then activated receiving power from the first terminal apparatus, and in step S3, the controller 5 of the IC card 1 waits for the first terminal apparatus to issue a polling command. After the first terminal apparatus issues a polling command during this wait state in step S3, the controller 5 of the IC card 1 transmits an ID number in step S4. After receiving the ID number during the wait state in step S2, the controller 55 of the first terminal apparatus, which has been waiting for the ID number, goes to step S6.

After the transmission of the ID number, the controller 5 of the IC card 1 judges whether to activate in the close mode or in the remote mode. In this example, the controller 5 judges to activate in the remote mode, and goes to step S7.

Steps 56 and S7 are performed for a mutual authentication process using a secret key. If this mutual authentication process ends abnormally, the controller 55 of the first terminal apparatus shuts the gate 49 and notifies the system administrator that the IC card may be improper, in step S8.

Figure 17:
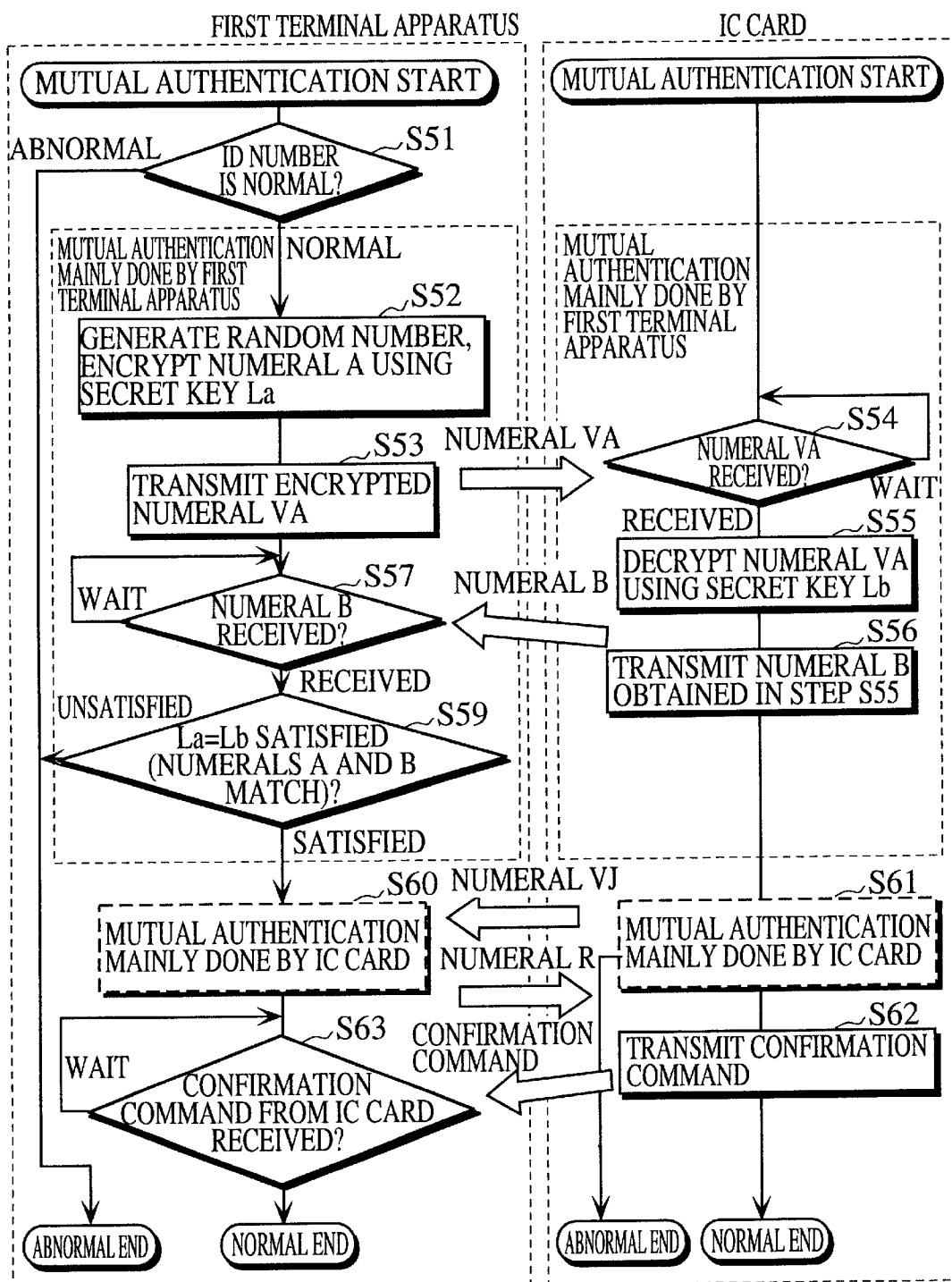
FIG. 17 is a sequence diagram showing the mutual authentication between the first terminal apparatus and the IC card.

Here, the mutual authentication between the first terminal apparatus and the IC card will be described with reference to FIG. 17. FIG. 17 is a sequence diagram showing the mutual authentication between the first terminal apparatus and the IC card.

The first process of the mutual authentication is mainly done by the first terminal apparatus. In step S51, the controller 55 of the first terminal apparatus judges whether the ID number is normal. When judging that the ID number is normal, the controller 55 of the first terminal apparatus generates a random number and encrypts an obtained numeral A using a predetermined secret key La in step S52, and sends a numeral VA (=encrypted numeral A) to the IC card in step S53.

In step S54, the controller 5 of the IC card waits for the first terminal apparatus to send the numeral VA. After receiving the numeral VA, the controller 5 goes to step S55 to decrypt the numeral VA using a secret key Lb which has been given from the first terminal apparatus in advance. The controller 5 then transmits a numeral B being a result of the decryption to the first terminal apparatus in step S56.

The first terminal apparatus waits for the IC card to send the numeral B in step S57. After receiving the numeral B in step S57, the first terminal apparatus goes to step S59. In step S59, the first terminal apparatus judges whether the numeral B matches the numeral A. When the numeral B matches the numeral A, the first terminal apparatus judges that a relationship La=Lb is satisfied, and completes the mutual authentication in terms of the secret key. This leads to the end of the process in the mutual authentication mainly done by the first terminal apparatus.

After this, a process in the mutual authentication is mainly done by the IC card in a similar manner in step S60 and S61. The IC card generates a random number J, encrypts it, sends an encrypted numeral VJ to the first terminal apparatus, receives from the first terminal apparatus a numeral K which is obtained by decrypting the numeral VJ, and judges whether the numeral K matches the numeral J. When they do not match, the IC card abnormally ends the mutual authentication process mainly done the IC card. When they match, the IC card sends an confirmation command to the first terminal apparatus in step S62 and ends the mutual authentication process.

The controller 55 of the first terminal apparatus waits for the IC card to send the confirmation command in step S63. When the controller 55 receives the confirmation command in step S63, the mutual authentication is completed.

When the mutual authentication ends normally, the controller 5 of the IC card 1 waits for the first terminal apparatus to issue the read command in step S9 shown in FIG. 16. In step S10, the controller 55 of the first terminal apparatus issues the read command to read information from the nonvolatile memory 12, the information indicates a section of a railway line the owner of the IC card travels and a valid period of the IC card as a commuter pass. The controller 55 then waits for the IC card to send the read data in step S11. When it receives the read command in step S9, the controller 5 of the IC card 1 goes to step S12. In step S12, the controller 5 of the IC card 1 analyzes and executes the read command to read information of a traveling section and a commuter pass valid period from the nonvolatile memories 12 and 13. The controller 5 then sends the read information to the first terminal apparatus in step S13, and waits for the controller 55 of the first terminal apparatus to issue the write command in step S14. After receiving the information, the controller 55 of the first terminal apparatus judges whether to permit the owner of the IC card to pass through the gate to ride on the train, based on the information of a traveling section and a commuter pass valid period. The controller 55 of the first terminal apparatus closes the gate 49 and refuses admission against the owner of the IC card when the station is not included in the traveling section or when the commuter pass valid period has expired. When the controller 55 permits the owner of the IC card to pass through the gate, the controller 55 issues the write command in step S15, and waits for the IC card to issue a data writing completion notice in step S16.

When the controller 5 of the IC card 1 receives the write command in step S14, the controller 5 goes to step S17 to analyze and execute the write command and writes information into the nonvolatile memory 12, the information indicating that the owner of the IC card has ridden on the train from the current station. The controller 5 then sends the data writing completion notice to the first terminal apparatus in step S18. Upon receipt of the data writing completion notice in step S16, the controller 55 of the first terminal apparatus goes to a loop consisting of steps S1 and S2 to wait for another owner of an IC card to approach.

Figure 18:
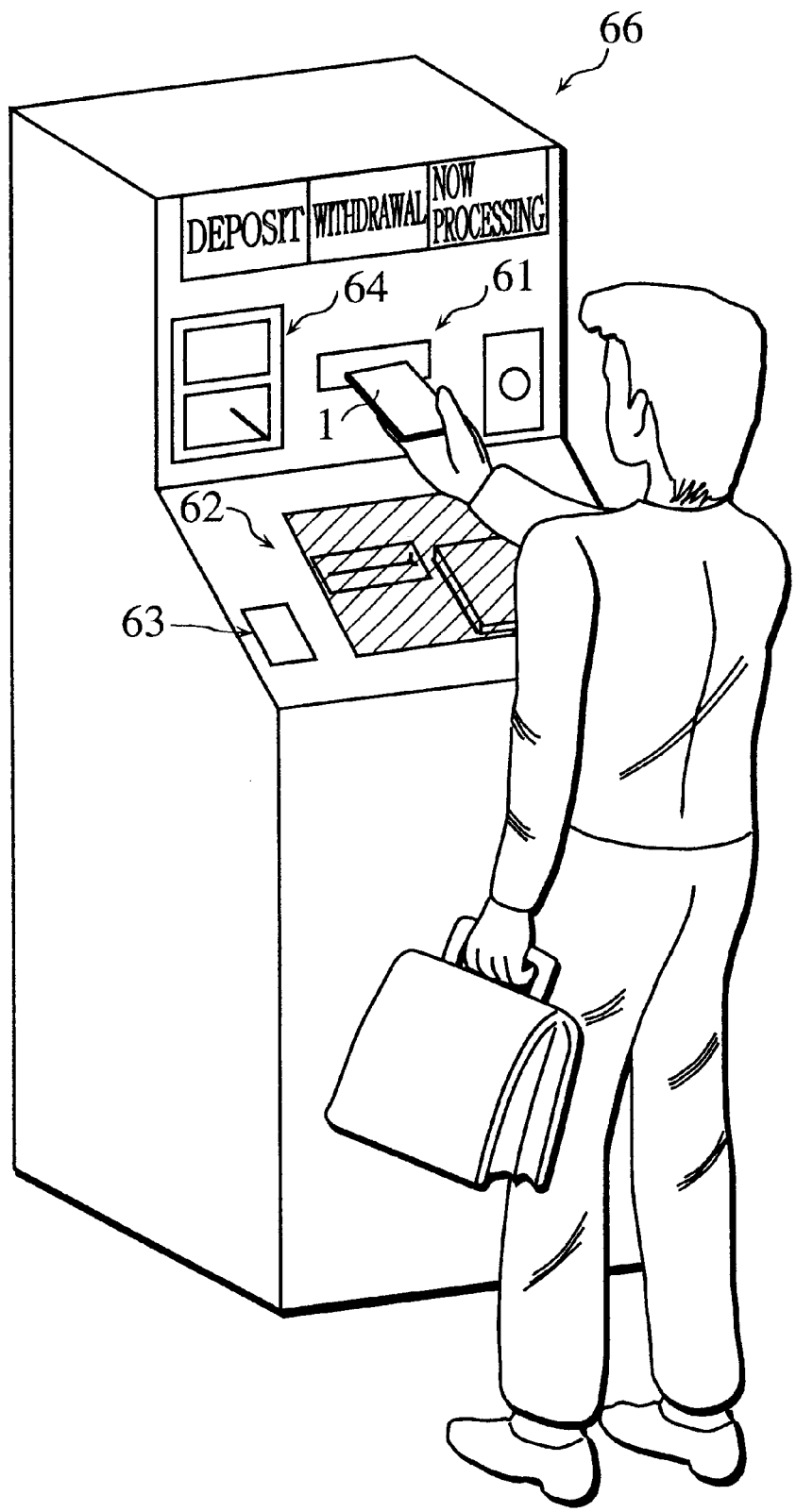
FIG. 18 shows an example of the second terminal apparatus used as a cash dispenser.

Now, the second terminal apparatus will be described. The second terminal apparatus is used in a machine for payment, such as a cash dispenser. FIG. 18 shows an example of the second terminal apparatus used in a cash dispenser. As shown in FIG. 18, a cash dispenser 60 includes: a slot 61 through which the IC card 1 is inserted; a touch panel 62 for receiving an input of an identification number of an IC card owner, or PIN (Personal Identification Number); a biosensor 63 for reading bio-information of the IC card owner, such as a face outline, irises in the eyes, or fingerprints; and a paper money supply box 64 into which paper money is supplied from inside the cash dispenser 60 when the IC card owner is authenticated through a mutual authentication using the card information and bio-information. A major difference between the first and second terminal apparatuses is a location of an antenna. That is to say, while the first terminal apparatus emits radio waves to outside the apparatus through the antenna, the second terminal apparatus emits radio waves to inside the apparatus. The second terminal apparatus has the antenna in a dedicated box which is electromagnetically shielded.

Figure 19:
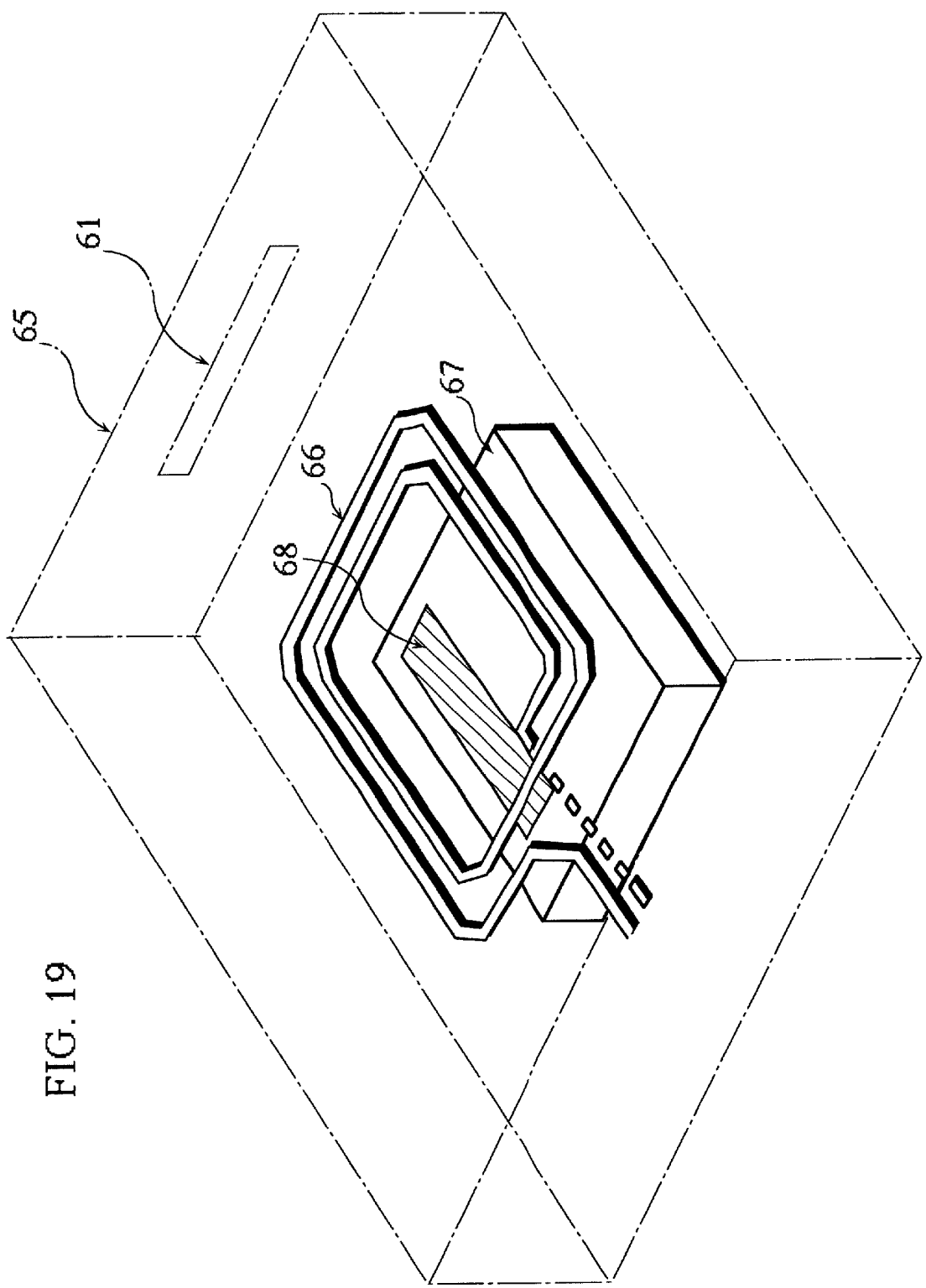
FIG. 19 shows a dedicated box 65 having an antenna.
Figure 20:
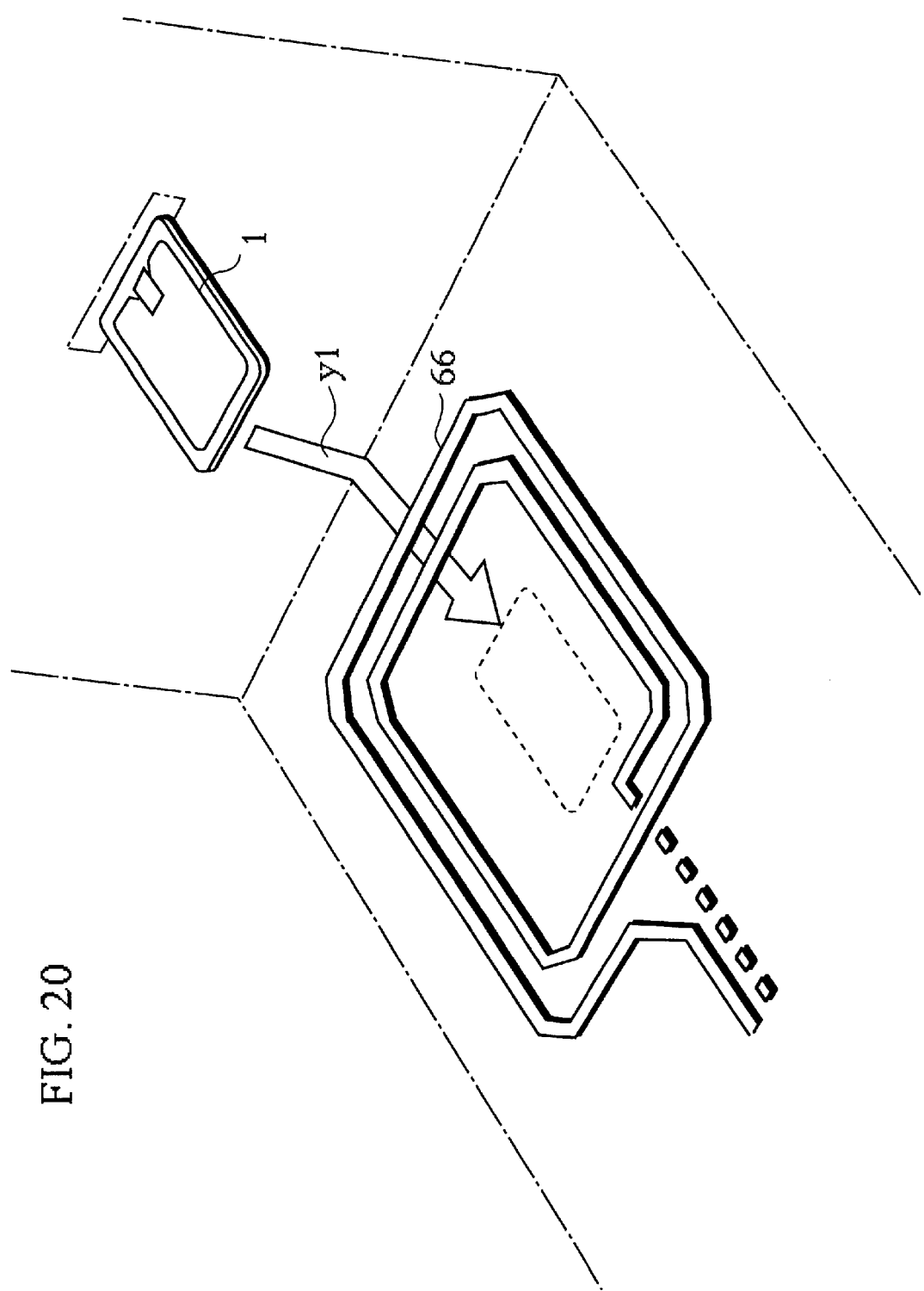
FIG. 20 shows how the IC card 1 is inserted under the loop antenna by the second terminal apparatus.
Figure 21A:
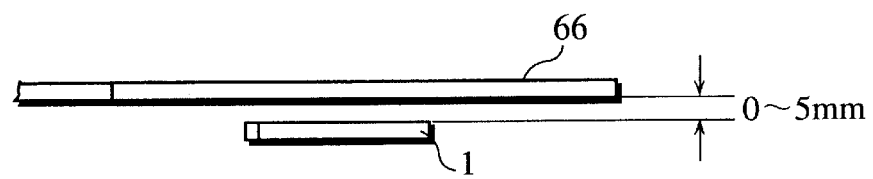
FIG. 21A shows that the IC card is close to the loop antenna 66 of the second terminal apparatus.

FIG. 19 shows a dedicated box 65 having an antenna. The dedicated box 65 has a slot 61 through which the IC card 1 is inserted into the box 65. The dedicated box 65 also includes: a loop antenna 66; a card tray 67 which is disposed under the loop antenna 66 and holds the IC card 1; a card sensor 68 for reading from the IC card 1 a magnetic code or physically recorded information such as an emboss, or optically or magneto-optically recorded information (hereinafter these types of information recorded in the card is referred to as card information); and loading mechanism (not illustrated) for receiving the IC card 1 through the slot 61 and load the card onto the card tray 67. FIG. 20 shows how the IC card 1 is inserted under the loop antenna by the second terminal apparatus. As indicated by an arrow y1 in the drawing, the IC card 1 is inserted just under the loop antenna. As shown in FIG. 21A, the distance between the loop antenna 66 and the IC card having been inserted as above is as close as only 0–5 mm.

Figure 21B:
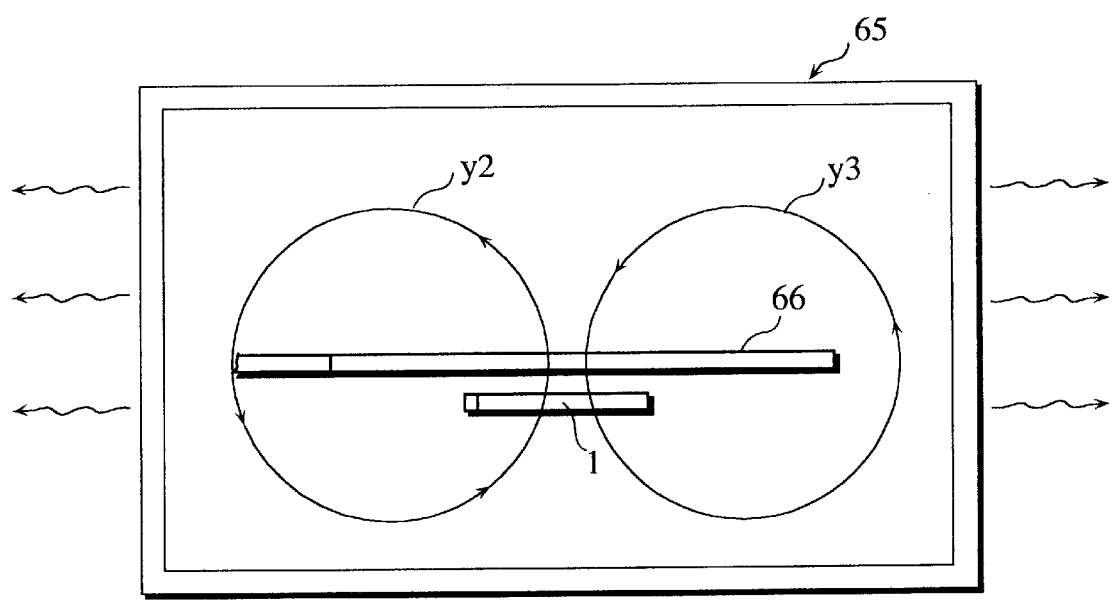
FIG. 21B shows that radio waves are generated as indicated by arrows y2 and y3 while the IC card is close to the loop antenna 66 of the second terminal apparatus.

When power is supplied to the high-power loop antenna 66 while the IC card 1 is placed under the antenna with a short distance in between as described above, radio waves are generated in a manner indicated by arrows y2 and y3 in FIG. 21B. Here, the generated radio waves do not leak from the dedicated box even when the loop antenna 66 transmits a radio wave having a power exceeding 10 mW since the dedicated box is electromagnetically shielded. Though in Japan, transmitting radio waves of 10 mW or higher without permission is banned by the Radio Law, the loop antenna provided in the second terminal apparatus can supply power using radio waves of 10 mW or higher, such as 20 mW or 30 mW. A supply of such a high power enables the IC card 1 to operate in the close mode. When high power is supplied, the integrated device in the IC card 1 can operate with a high-frequency synchronization clock signal, and the controller 5 can run a high-level application program. The high-level application program is, for example, JICSAP (Japan IC Card System Application council) being multi-OS software developed for the JAVA Card (JAVA Card is a card standard proposed by Sun Microsystems Inc.), or software proposed by EMV.

Figure 22:
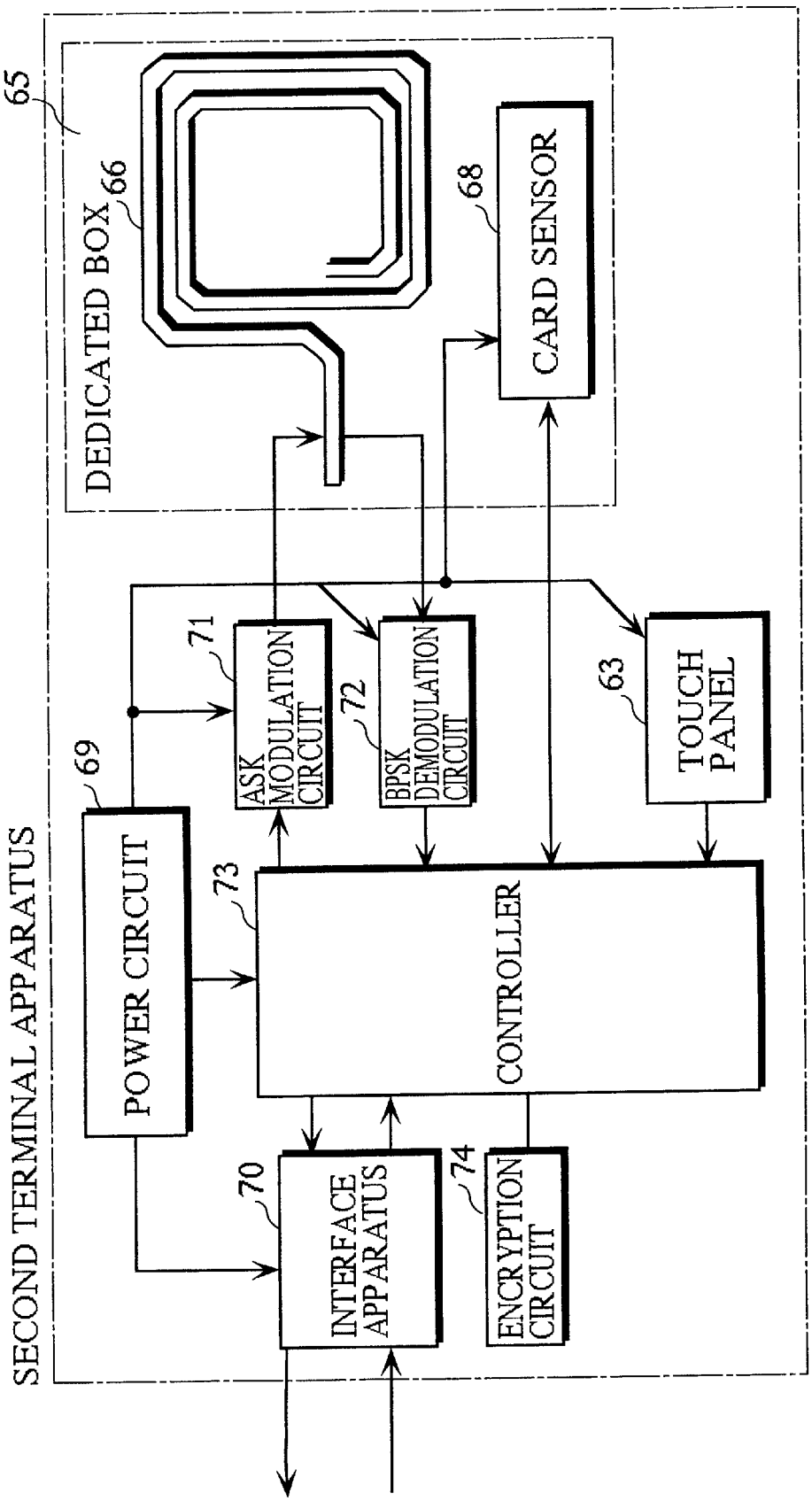
FIG. 22 shows an internal structure of the second terminal apparatus.

The internal structure of the second terminal apparatus will be described. FIG. 22 shows the internal structure of the second terminal apparatus. As shown in FIG. 22, the second terminal apparatus includes a power circuit 69, an interface apparatus 70, an ASK modulation circuit 71, a BPSK demodulation circuit 72, a controller 73, and an encryption circuit 74. The ASK modulation circuit 71 and the BPSK demodulation circuit 72 are connected to the high-power loop antenna 66. The card sensor 68 is connected to the controller 73. The second terminal apparatus differs from the first terminal apparatus in that the ASK modulation circuit 71 and the BPSK demodulation circuit 72 supply higher power to the IC card 1 in the close mode than the first terminal apparatus, and that the encryption circuit 74 encrypts and decrypts data using a secret key and performs a mutual authentication using the public key encryption which provides higher security.

Figure 21C:
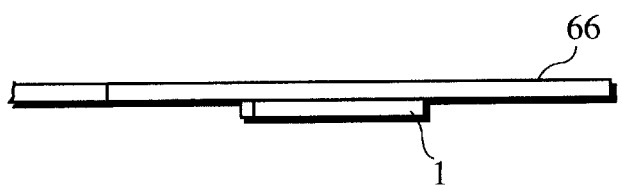
FIG. 21C shows that the IC card 1 has been inserted into the second terminal apparatus so that the IC card 1 is in contact with the loop antenna 66.
Figure 23:
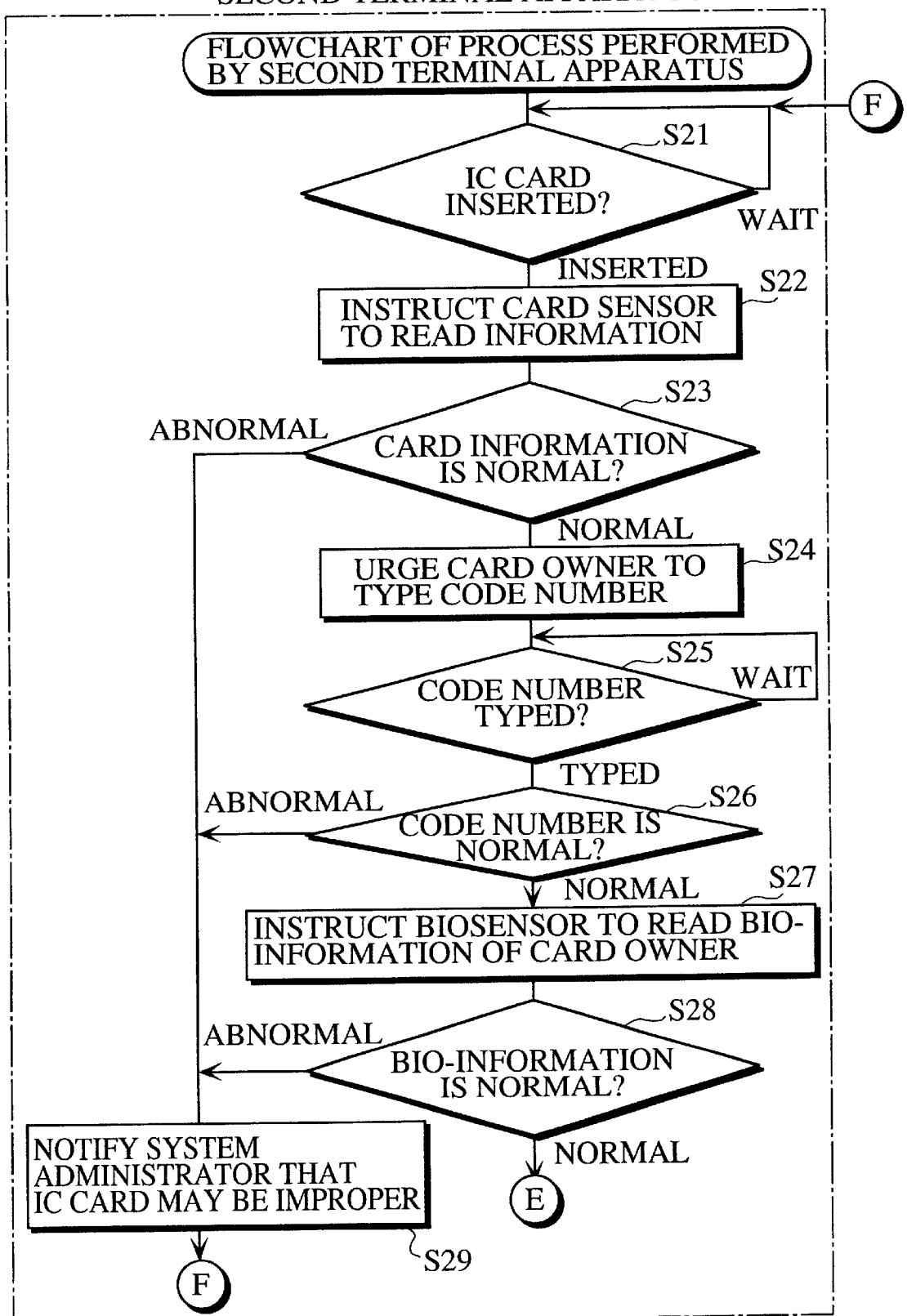
FIG. 23 is a flowchart showing the procedure of the controller 73 of the second terminal apparatus.

The above processes of the second terminal apparatus are controlled by the controller 73. FIG. 23 is a flowchart showing the procedure of the controller 73 of the second terminal apparatus. Here, the communication protocol will be described with reference to FIG. 23. The controller 73 of the second terminal apparatus always waits for the IC card 1 to be inserted and loaded onto the card tray 67. When an owner of the IC card 1 inserts the IC card 1 into the slot, the IC card 1 is sucked into and loaded in the second terminal apparatus. When the IC card 1 has been inserted into the second terminal apparatus, the IC card is close to the loop antenna 66 of the second terminal apparatus, as shown in FIG. 21A. The IC card 1 is disposed under the center of the loop antenna. When a radio wave is induced in the loop antenna 66 in this condition, the IC card 1 is supplied with high power. Though FIG. 21A shows that the distance between the loop antenna 66 and the IC card 1 is 0–5 mm, the IC card may be in contact with the loop antenna 66 as shown in FIG. 21C in so far as they are kept not to be in electric contact with each other.

After the IC card 1 is inserted, the controller 73 of the second terminal apparatus instructs the card sensor 68 to read the card information in step S22, and judges whether the card information is normal in step S23. When the controller 73 judges that the card information is abnormal due to lack of a magnetic code or an emboss, or due to a trace of improper manufacturing, the controller 73 warns the card owner of it, ejects the IC card 1, goes to step S29, and notifies the system administrator that the IC card may be improper. When the controller 73 judges that the card information is normal in step S23, the controller 73 goes to step S24 and urges the card owner to type a code number. The controller 73 then waits for the code number to be typed in step S25. After the code number is typed, the controller 73 compares the code number included in the card information with the typed code number in step S26. When they do not match, the controller 73 goes to step S29 to notify the system administrator that the IC card may be improperly owned. When the two code numbers match in step S26, the controller 73 goes to step S27 to activate the biosensor 63 and instruct the biosensor 63 to read the bio-information of the card owner such as a face outline, irises in the eyes, or fingerprints. In step S28, the controller 73 inquires the host apparatus whether the IC card 1 is owned properly based on the bio-information. The host apparatus has a database which stores a plurality of entries of IC card code numbers in correspondence with a plurality of pieces of bio-information, so that the host apparatus can judge whether the card owner is proper. If a combination of the bio-information read by the biosensor 63 and the typed code number is not found in the database, since the card owner may have obtained or manufactured the IC card 1 improperly, the controller 73 goes to step S29 to notify the system administrator of it. When a combination of the bio-information read by the biosensor 63 and the typed code number is found in the database, the controller 73 goes to the process in the flowchart shown in FIG. 24.

Figure 24:
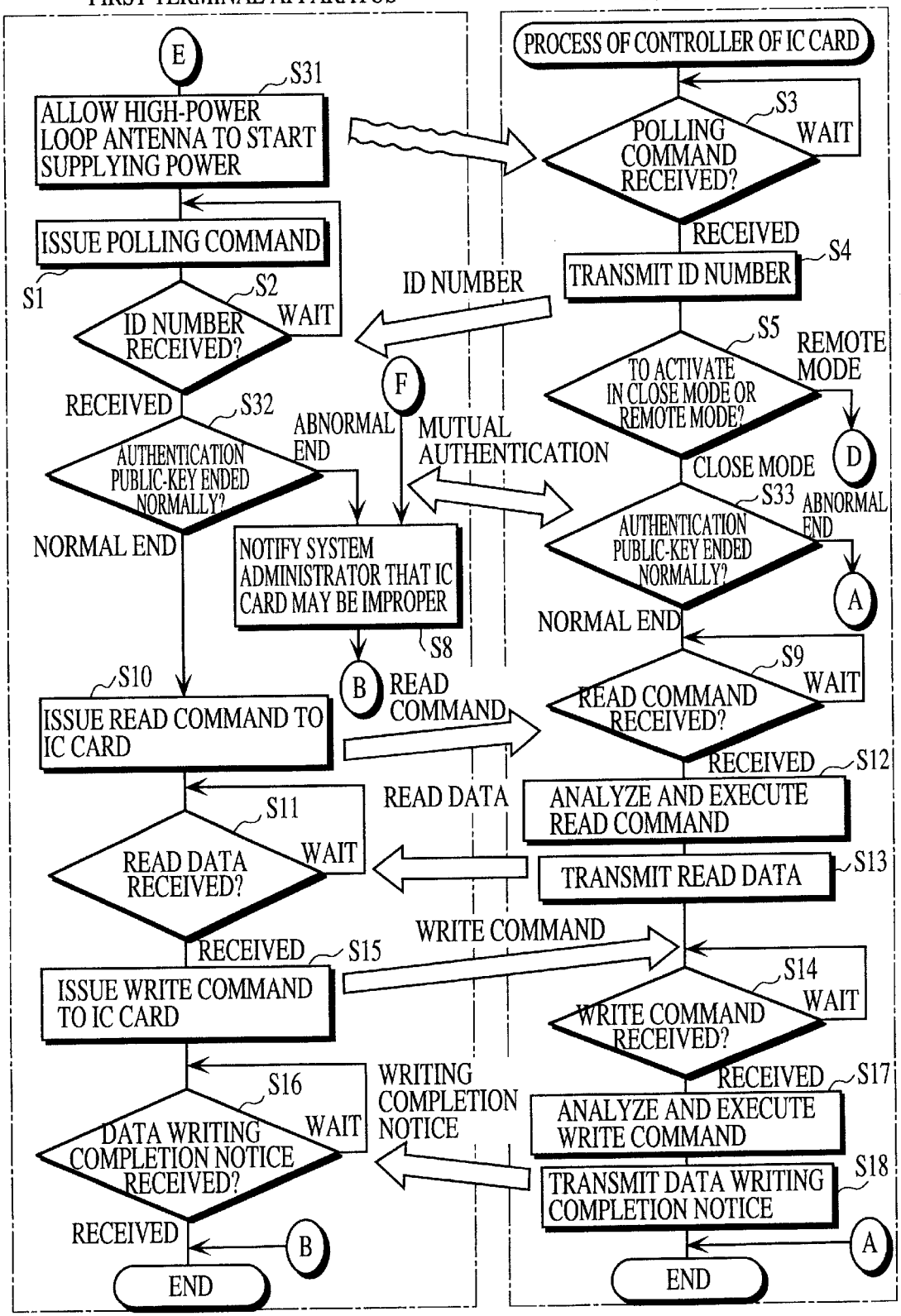
FIG. 24 shows how the controller 73 of the second terminal apparatus coordinates with the controller 7 of the IC card 1.

After this, the controller 73 of the second terminal apparatus and the controller 7 of the IC card 1 coordinate with each other in accordance with the flowchart shown in FIG. 24. Note that the steps with the same reference signs in the flowcharts shown in FIGS. 16 and 24 perform the same operations. The flowchart shown in FIG. 24 differs from FIG. 16 in that power is supplied from the high-power loop antenna 66 in step S31 before the polling command is issued in step S1, that the mode switching is performed in step S5, and the IC card is activated in the close mode, that the mutual authentication is performed in steps S32–S33 using a public key while in FIG. 16, the mutual authentication is performed in steps S6–S7 using a secret key, and that data is encrypted when the data is transmitted or received using the read command or the write command, and encrypted data is decrypted by the encryption circuit 10. Also, the polling command issued by the second terminal apparatus is different from that issued by the first terminal apparatus. With this construction, the IC card can immediately recognize the terminal apparatus to which the IC card is coming closer is the first terminal apparatus or the second terminal apparatus.

Figure 25:
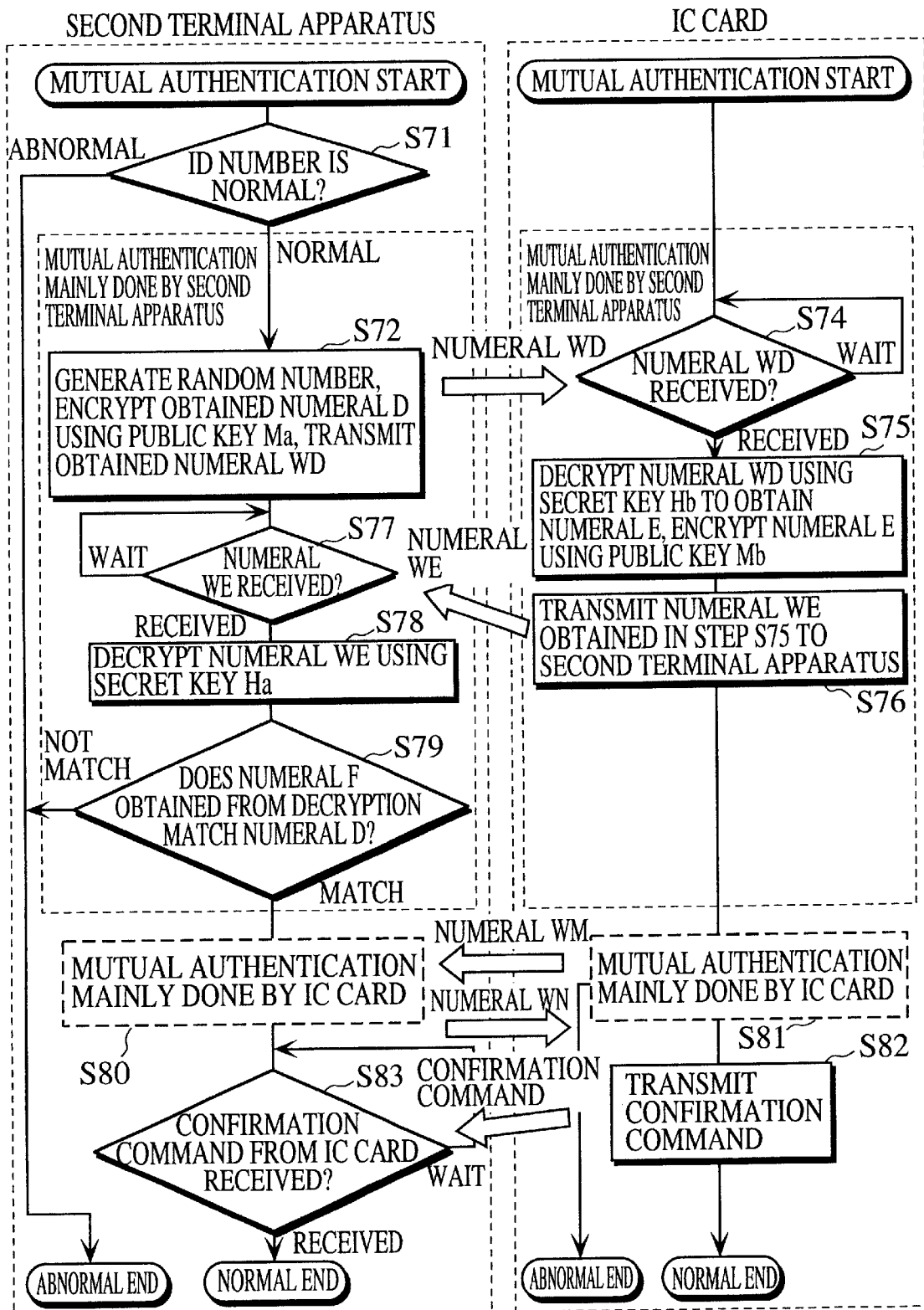
FIG. 25 shows a mutual authentication performed between the first terminal apparatus and the IC card.

Here, the mutual authentication performed between the second terminal apparatus and the IC card in steps S32 and S33 in FIG. 24 will be described with reference to FIG. 25. FIG. 25 is a sequence diagram showing the mutual authentication between the second terminal apparatus and the IC card.

In step S71, the controller 73 of the second terminal apparatus judges whether the ID number is proper. When judging that the ID number is proper, the controller 73 of the second terminal apparatus generates a random number and encrypts an obtained numeral D using a predetermined public key Ma in step S72, and sends a numeral (=encrypted numeral WD) to the IC card in step S72, where the public key Ma and a secret key Ha have been prepared in advance.

In step S74, the controller 5 of the IC card waits for the second terminal apparatus to send the numeral WD. After receiving the numeral WD, the controller 5 goes to step S75 to instruct the encryption circuit 10 to decrypt the numeral WD using a secret key Hb to obtain a numeral E, and encrypt the numeral E using a public key Mb to obtain a numeral WE, where the secret key Hb and the public key Mb have been prepared in advance. The controller 5 then goes to step S76 to transmit the numeral WE to the second terminal apparatus.

The controller 73 of the second terminal apparatus waits for the IC card to send the numeral WE in step S77. After receiving the numeral WE in step S77, the second terminal apparatus goes to step S78. In step S78, the controller 73 of the second terminal apparatus decrypts the numeral WE using the secret key Ha. The controller 73 then judges whether the numeral F obtained by decrypting the numeral WE matches the numeral D in step S79. When they match, the second terminal apparatus completes the process of the mutual authentication which is mainly done by the second terminal apparatus.

After this, a process in the mutual authentication is mainly done by the IC card in a similar manner in steps S80 and S81. The IC card generates a random number M, encrypts it using the public key Mb, and sends an encrypted numeral WM to the second terminal apparatus. The second terminal apparatus decrypts the numeral WM using a secret key, encrypts it using a public key to obtain a numeral WN, and sends the numeral WN to the IC card. The IC card receives from the second terminal apparatus the numeral WN, obtains a numeral N by decrypting the numeral WN, and judges whether the numeral n matches the numeral M. When they do not match, the IC card abnormally ends the mutual authentication process. When they match, the IC card sends an confirmation command to the second terminal apparatus in step S82 and ends the mutual authentication.

The controller 73 of the second terminal apparatus waits for the IC card to send the confirmation command in step S83. When the controller 73 receives the confirmation command in step S83, the mutual authentication is completed.

It is understood from the above description that security is higher in the close mode than in the remote mode.

As described above, the second terminal apparatus has a mechanism that prevents radio waves from leaking, such as an electromagnetically shielded box. With this construction, when a portable card is placed in the electromagnetically shielded box, personal information cannot be intercepted by an improperly intentioned third party while being transferred between the second terminal apparatus and the integrated device. Since the nonvolatile memory 13 in the IC card 1 is activated only in the close mode as described above, the nonvolatile memory 13 is useful for storing personal information for which high security is required. When the personal information is stored in the nonvolatile memory 13, the one-chip IC of the IC card 1 can coordinate with the second terminal apparatus in terms of the personal information without being in electric contact with the internal circuit of the terminal apparatus. In this way, the coordination process between the IC card 1 and the second terminal apparatus is performed while the integrated device is not in contact with the internal circuit of the terminal apparatus. As a result, no maintenance is required for both the IC card 1 and the second terminal apparatus. Also, since the nonvolatile memory 13 is activated only when the IC card 1 approaches the terminal apparatus, the card owner need not attach a connector to both the terminal apparatus and the IC card, for example, which provides high convenience to the owners of the IC card 1. As described above, as is the case with the conventional IC card 1 for the remote mode, the IC card 1 of the present invention can coordinate with the first terminal apparatus in the remote mode. In addition, the IC card 1 of the present invention can be used for payment, which has been considered as not suitable for the conventional IC card 1 for the remote mode from a security standpoint. In other words, one piece of IC card 1 can manage a plurality of different kinds of personal information.

It is to be noted that various changes may be made without departure from the scope of the present invention. The following are examples of such changes.

(a) In the present embodiment, the first terminal apparatus is attached to an automatic ticket gate in a station. However, the first terminal apparatus may be attached to a cash dispenser for a small-money finance. More specifically, in this case, the nonvolatile memory 12 stores names and code numbers of card owners, and when the IC card 1 approaches the first terminal apparatus, the first terminal apparatus issues a read command to read the name and PIN from the IC card 1. The first terminal apparatus then issues a write command to the IC card 1, so that the IC card 1 writes a sum of a loan to the nonvolatile memory 12. The first terminal apparatus then instructs the cash dispenser to pay the sum of the loan.

(b) In the present embodiment, the first terminal apparatus is a attached to an automatic ticket gate and the second terminal apparatus is attached to a cash dispenser. However, a terminal apparatus may have functions of both the first and second terminal apparatuses. More specifically, in this case: when an IC card approaches the terminal apparatus to be several cm to 10 cm away from the terminal apparatus, the terminal apparatus sets the one-chip IC to the remote mode then transmits and receives radio waves to/from the IC card to output and input data to/from the one-chip IC while they are not in contact with each other; and when an IC card approaches the terminal apparatus to be 0–5 mm away from the terminal apparatus, the terminal apparatus sets the one-chip IC to the close mode then transmits and receives radio waves to/from the IC card to output and input data to/from the one-chip IC while they are not in contact with each other. Also, a program that allows a general-purpose computer to execute such functions may be recorded into a computer-readable record medium for use. In this case, the general-purpose computer should have an ASK modulation circuit and a BPSK demodulation circuit. When an IC card approaches the general-purpose computer to be several cm to 10 cm away from the general-purpose computer, the general-purpose computer sets the one-chip IC to the remote mode then transmits and receives radio waves to/from the IC card to output and input data to/from the one-chip IC while they are not in contact with each other; and when an IC card approaches the general-purpose computer to be 0–5 mm away from the general-purpose computer, the general-purpose computer sets the one-chip IC to the close mode then transmits and receives radio waves to/from the IC card to output and input data to/from the one-chip IC while they are not in contact with each other.

(c) In the above embodiment, the switching to the close mode is done using a voltage received by the antenna and the polling command. However, the mode switching may be done using (1) one of a plurality of types of information: information physically recorded in the IC card; information recorded optically or magneto-optically in the IC card; a code number of the IC card owner; and bio-information of the IC card owner, or any combination of these types of information, and (2) personal information stored in a memory. Also, the voltage received by the antenna and the polling command may be used in combination with the above information.

(d) In the present embodiment, either signals CE1 and CE2 output from the MPU 22 or signals CE1 and CE2 output from the enable signal generation unit 29 are output to the nonvolatile memories 12 and 13. However, an access to the nonvolatile memory 12 or 13 may be permitted only when signals CE1 and CE2 are output from both the MPU 22 and the enable signal generation unit 29. With this construction, switching to the close mode is done more strictly, making improper accesses to the IC card difficult.

In the present embodiment, either signals SE1 and SE2 output from the MPU 22 or signals SE1 and SE2 output from the selection signal generation unit 34 are output to the encryption circuits 10 and 11. However, the encryption circuits 10 and 11 may be activated only when signals SE1 and SE2 are output from both the MPU 22 and the selection signal generation unit 34.

INDUSTRIAL APPLICABILITY

The present invention can be used as an automatic ticket gate and a cash dispenser for automatic checking at a facility gate or a ticket gate or for a payment at a local government, a transport facility, a financial institution, a medical institution or the like that deals with a great many of residents, clients, or employees.

What is claimed is:

1. A dual-purpose portable card, the portable card comprising an integrated device which includes:

an identifying unit operable to, when the portable card approaches a terminal apparatus, identify either a first purpose or a second purpose for which the portable card is used, according to an output level of a radio wave transmitted from the terminal apparatus;

a processing unit operable to perform a first process using the radio wave when the portable card is used for the first purpose and perform a second process using the radio wave when the portable card is used for the second purpose; and a communicating unit operable to perform a non-contact-type data input/output between the terminal apparatus and the processing unit by performing radio communication with the terminal apparatus when the portable card is used for either of the first purpose and the second purpose.

2. The portable card of claim 1, wherein the identifying unit includes:

a judging unit operable to judge according to the output level of the radio wave transmitted from the terminal apparatus that the portable card is used for the second purpose when the portable card is a first distance or shorter away from the terminal apparatus, and judge according to the output level of the radio wave transmitted from the terminal apparatus that the portable card is used for the first purpose when a distance between the portable card and the terminal apparatus is in a range of a second distance to a third distance.

3. The portable card of claim 2, wherein the integrated device receives a power supply from the terminal apparatus, the power the terminal apparatus supplies to the integrated device changes according to the distance between the portable card and the terminal apparatus, the identifying unit includes a comparing unit operable to compare a received voltage of a radio wave received by an antenna with a predetermined threshold value, and the judging unit judges that the portable card is the first distance or shorter away from the terminal apparatus when the received voltage is higher than the predetermined threshold value, and judges that the distance between the portable card and the terminal apparatus is in the range of the second distance to the third distance when the received voltage is lower than the predetermined threshold value.

4. The portable card of claim 3, wherein the terminal apparatus is either a first terminal apparatus that outputs a radio wave having power lower than a first power level to the portable card, or a second terminal apparatus that has an antenna in an electromagnetically shielded box and outputs a radio wave having power of a second power level that is twice the first power level or higher, to the portable card in the box, and the predetermined threshold value is determined based on (1) received power of a radio wave that has power of the first power level and is received when the distance between the portable card and the terminal apparatus is in the range of the second distance to the third distance and (2) received power of a radio wave that has power of the second power level and is received when the distance between the portable card and the terminal apparatus is the first distance or shorter.

5. The portable card of claim 4, wherein the second purpose deals with more confidential data than the first purpose, the first process includes at least one of an encryption process for encrypting data using a first encryption key, a decryption process for decrypting data using the first encryption key, a certification process for certifying, in response to an authentication process performed by the terminal apparatus, authenticity of the portable card using the first encryption key, and an authentication process for authenticating the terminal apparatus using the first encryption key, the second process includes at least one of an encryption process for encrypting data using a second encryption key which provides higher security than the first encryption key, a decryption process for decrypting data using the second encryption key, a certification process for certifying, in response to an authentication process performed by the terminal apparatus, authenticity of the portable card using the second encryption key, and an authentication process for authenticating the terminal apparatus using the second encryption key, the second process has a heavier processing load than the first process, and the second power level is determined based on an amount of power consumed when the processing unit performs the second process.

6. The portable card of claim 5, wherein the integrated device includes a storage unit which includes (1) a first area for storing data that is used only for the first purpose and (2) a second area for storing data that is used only for the second purpose, communicating unit includes a transmission/reception unit operable to receive a command issued by the terminal apparatus and transmit data to the terminal apparatus using wireless communication, the processing unit includes an access managing unit operable to, when the identifying unit has identified either the first or second purpose, permit either the first or second area corresponding to the identified purpose to be accessed and prohibit the other areas from being accessed, a decoding unit operable to decode the command received by the transmission/reception unit, and a memory access unit operable to, when the decoding unit detects that the command is a read command as a result of the decoding, read a piece of data specified by the read command from either the first or second area and instruct the transmission/reception unit to transmit the piece of data, and operable to, when the decoding unit detects that the command is a write command as a result of the decoding, write a piece of data specified in the write command to the first or second area.

7. The portable card of claim 4, wherein the integrated device includes a synchronization clock signal generation unit operable to, when the first terminal apparatus supplies power of the first power level to the portable card, send to the processing unit a synchronization clock signal having a first frequency that is generated in accordance with a frequency of a carrier of a received signal, and operable to, when the second terminal apparatus supplies power of the second power level to the portable card, send to the processing unit a synchronization clock signal having a second frequency that is higher than the first frequency.

8. The portable card of claim 1, wherein the terminal apparatus is either a first terminal apparatus that performs a polling by outputting a radio wave that includes a first polling command, and a second terminal apparatus that Performs a polling by outputting a radio wave that includes a second polling command, the first terminal apparatus and the second terminal apparatus transmit radio waves of different output levels, the identifying unit includes a judging unit operable to, when the portable card approaches either the first terminal apparatus or the second terminal apparatus which is performing a polling by transmitting a radio wave, judge whether the transmitted radio wave includes the first polling command or the second polling command, and a detection unit operable to detect which of the first terminal apparatus and the second terminal apparatus the portable card is approaching, according to the output level of the radio wave transmitted from the terminal apparatus, the identifying unit identifies the first purpose when the judging unit judges that the radio wave includes the first polling command and when the detection unit detects that the portable card is approaching the first terminal apparatus, and identifies the second purpose when the judging unit judges that the radio wave includes the second polling command and when the detection unit detects that the portable card is approaching the second terminal apparatus.

9. A dual-purpose portable card, the portable card comprising an integrated device which includes:

an identifying unit operable to, when the portable card approaches a terminal apparatus, identify either a first purpose or a second purpose for which the portable card is used, according to a radio wave transmitted from the terminal apparatus;

a processing unit operable to perform a first process when the portable card is used for the first purpose and perform a second process when the portable card is used for the second purpose; and a communicating unit operable to perform a non-contact-type data input/output between the terminal apparatus and the processing unit by performing radio communication with the terminal apparatus including a mutual authentication sequence which differs according to a difference between the first purpose and the second purpose.

10. A dual-purpose portable card, the portable card comprising an integrated device which includes:

an identifying unit operable to, when the portable card approaches a terminal apparatus, identify either a first purpose or a second purpose for which the portable card is used, according to an output level of a radio wave transmitted from the terminal apparatus;

a processing unit operable to perform a first process using the radio wave when the portable card is used for the first purpose and perform a second process using the radio wave when the portable card is used for the second purpose; and a communicating unit operable to perform a non-contact-type data input/output between the terminal apparatus and the processing unit by performing radio communication with terminal apparatus including a mutual authentication sequence which differs according to a difference between the first purpose and the second purpose.

11. A dual-purpose portable card, the portable card comprising an integrated device which includes:

an identifying unit operable, when the portable card approaches a terminal apparatus, identify either a first purpose or a second purpose for which the portable card is used, according to an output level of a radio wave transmitted from the terminal apparatus;

a processing unit operable to perform a first process using the radio wave when the portable card is used for the first purpose and perform a second process using the radio wave when the portable card is used for the second purpose; and a communicating unit operable to perform a non-contact type data input/output between the terminal apparatus and the processing unit by performing radio communication with the terminal apparatus when the portable card is used for either of (1) when the processing unit needs to input or output data to/from the terminal apparatus to perform the first process, and (2) when the processing unit needs to input or output data to/from the terminal apparatus to perform the second process.

\* \* \* \* \*